(12) United States Patent
Narushima

(10) Patent No.: US 12,537,920 B2
(45) Date of Patent: Jan. 27, 2026

(54) INFORMATION PROCESSING DEVICE AND INFORMATION PROCESSING METHOD

(71) Applicant: MICWARE CO., LTD., Hyogo (JP)

(72) Inventor: Kenji Narushima, Hyogo (JP)

(73) Assignee: MICWARE CO., LTD., Hyogo (JP)

( * ) Notice: Subject to any disclaimer, the term of this patent is extended or adjusted under 35 U.S.C. 154(b) by 0 days.

(21) Appl. No.: 19/209,740

(22) Filed: May 15, 2025

(65) Prior Publication Data

US 2025/0280095 A1 Sep. 4, 2025

Related U.S. Application Data

(63) Continuation of application No. PCT/JP2022/043179, filed on Nov. 22, 2022.

(51) Int. Cl.
*H04N 7/18* (2006.01)
*G06T 11/60* (2006.01)

(52) U.S. Cl.
CPC ............ *H04N 7/183* (2013.01); *G06T 11/60* (2013.01)

(58) Field of Classification Search
CPC ... G06T 11/60; G06T 7/73; G06T 7/30; G06T 7/246; G06T 19/00; H04N 7/183; G06F 18/22
See application file for complete search history.

(56) References Cited

U.S. PATENT DOCUMENTS

2018/0174342 A1* 6/2018 Suttmann .............. G06T 3/4038
2023/0118280 A1* 4/2023 Heidmann .............. G06F 18/22
345/419

FOREIGN PATENT DOCUMENTS

| JP | 2002042273 | 2/2002 |
|---|---|---|
| JP | 2003044956 | 2/2003 |
| JP | 2003067895 | 3/2003 |
| JP | 2014192632 | 10/2014 |
| JP | 2016072867 | 5/2016 |
| JP | 2017045102 | 3/2017 |

OTHER PUBLICATIONS

"International Search Report (Form PCT/ISA/210) of PCT/JP2022/043179", mailed on Feb. 14, 2023, with English translation thereof, pp. 1-4.

* cited by examiner

*Primary Examiner* — Xi Wang
(74) *Attorney, Agent, or Firm* — JCIPRNET

(57) ABSTRACT

In the related art, it is not possible to acquire images of a moving target captured continuously. An information processing device 1 including the following is capable of acquiring images of a moving target captured continuously: a position reception part 122 that sequentially receives a plurality of pieces of position information at different times for a moving target terminal 4; an image acquisition part 132 that acquires images from a mobile terminal 2 obtained by capturing regions corresponding to the plurality of pieces of position information received by the position reception part 122; and an image transmission part 141 that transmits a single image based on the images acquired by the image acquisition part 132.

2 Claims, 20 Drawing Sheets

| ID | Terminal identifier (right holder identifier) | Image attribute value | | | | | | | | |
|---|---|---|---|---|---|---|---|---|---|---|
| | | Environmental Information | | | | | | | Movement information | ... |
| | | Position information | Direction information | Camera information | | Time information | ... | ... | | |
| | | | | Angle of view | Resolution | | | | | |
| 1 | U001 | $(x_{11}, y_{11})$ | $d_{11}$ | $D_1$ | $R_1$ | $t_{11}$ | ... | ... | 1 | ... |
| | | $(x_{12}, y_{12})$ | $d_{12}$ | | | $t_{12}$ | ... | | | |
| | | ... | ... | | | ... | ... | | | |
| 2 | U003 | $(x_{31}, y_{31})$ | $d_{31}$ | $D_3$ | $R_3$ | $t_{31}$ | ... | ... | 0 | ... |
| | | $(x_{32}, y_{32})$ | $d_{32}$ | | | $t_{32}$ | ... | | | |
| | | ... | ... | | | ... | ... | | | |
| ... | ... | ... | ... | ... | ... | ... | ... | ... | ... | ... |

| ID | Image identifier (NFT identifier) | Access information | Right holder identifier | Right registration date | Image information |||||||||||| Provision flag |
|---|---|---|---|---|---|---|---|---|---|---|---|---|---|---|---|---|
| | | | | | Image attribute value ||||||||||| |
| | | | | | Frame identifier | Environmental Information |||||| Tag |||| | |
| | | | | | | Position information | Direction information | Camera information || Time information | ... | Accident | Traffic jam | Dangerous driving | ... | ... | |
| | | | | | | | | Angle of view | Resolution | | | | | | | | |
| 1 | NFT01 | | U001 | 2022/4/25 | F1001 | $(x_{11}, y_{11})$ | $d_{11}$ | $D_1$ | $R_1$ | $t_{11}$ | ... | — | 1 | — | ... | ... | 1 |
| | | | | | F1002 | $(x_{12}, y_{12})$ | $d_{12}$ | | | $t_{12}$ | ... | 1 | 1 | — | ... | ... | |
| | | | | | ... | ... | ... | | | ... | ... | ... | ... | ... | ... | ... | |
| 2 | NFT02 | | U002 | 2022/4/25 | F2001 | $(x_{21}, y_{21})$ | $d_{21}$ | $D_2$ | $R_2$ | $t_{21}$ | ... | — | — | — | ... | ... | 1,2 |
| | | | | | F2002 | $(x_{22}, y_{22})$ | $d_{22}$ | | | $t_{22}$ | ... | — | — | — | ... | ... | |
| | | | U101 | 2022/4/25 | ... | ... | ... | ... | ... | ... | ... | ... | ... | ... | ... | ... | |
| ... | ... | ... | ... | ... | ... | ... | ... | ... | ... | ... | ... | ... | ... | ... | ... | ... | ... |

INFORMATION PROCESSING DEVICE AND INFORMATION PROCESSING METHOD

CROSS-REFERENCE TO RELATED APPLICATION

The present application is a continuation of PCT/JP2022/043179, filed on Nov. 22, 2022. The entire contents of the aforementioned application are hereby incorporated by reference herein.

TECHNICAL FIELD

The disclosure relates to an information processing device, etc. that performs processing related to images of a moving target captured by a mobile terminal.

BACKGROUND

There is a position search imaging system which captures images of a person or object that can move freely within a predetermined region, and is capable of searching for the position thereof (see Patent Document 1).

RELATED ART DOCUMENT

Patent Document

[Patent Document 1] Japanese Patent Application Laid-Open No. 2003-67895

However, in the related art, only images captured by a fixed camera are used, so it is not possible to continuously acquire images of a moving target in the region where the fixed camera does not exist.

SUMMARY

An information processing device of the first aspect of the disclosure includes: a storage part storing a target terminal identifier that identifies a target terminal and a user terminal identifier that identifies a user terminal in association with each other; a reception part sequentially receiving target terminal position information that indicates a plurality of positions at different times of the target terminal which is moving, together with the target terminal identifier; an acquisition part acquiring, from a mobile terminal that captures images of a region corresponding to each piece of the target terminal position information received by the reception part, a plurality of region images which are images obtained by shooting within the region, in which each of the region images is an image in which an attribute value set and a right holder identifier are associated with each other, in which the attribute value set includes two or more pieces of environmental information that includes position information specifying a shooting position and time information specifying a shooting time, and the right holder identifier identifies a right holder of the region image; a construction part, based on each piece of the target terminal position information, temporally combining the plurality of region images acquired, or spatially fusing parts of the plurality of region images, to construct a single provision image; a transmission part transmitting the provision image to the user terminal indicated by the user terminal identifier stored in association with the target terminal identifier in the storage part; and a right holder processing part performing second preservation processing to accumulate the right holder identifiers respectively associated with the plurality of region images constituting the provision image in association with the provision image.

With such a configuration, a useful single image can be provided using images from a mobile terminal that captures the target being watched over.

Furthermore, in the information processing device of the second aspect, in addition to the first aspect, the right holder processing part further performs third preservation processing to accumulate the right holder identifier identifying the user terminal which is a provision destination to which the provision image is transmitted, in association with the provision image.

With the information processing device according to the disclosure, it is possible to acquire images of a moving target captured continuously.

BRIEF DESCRIPTION OF THE DRAWINGS

FIG. 17 is a diagram showing a terminal management table.
FIG. 18 is a diagram showing a registered image management table.

DESCRIPTION OF THE EMBODIMENTS

Figure 1:
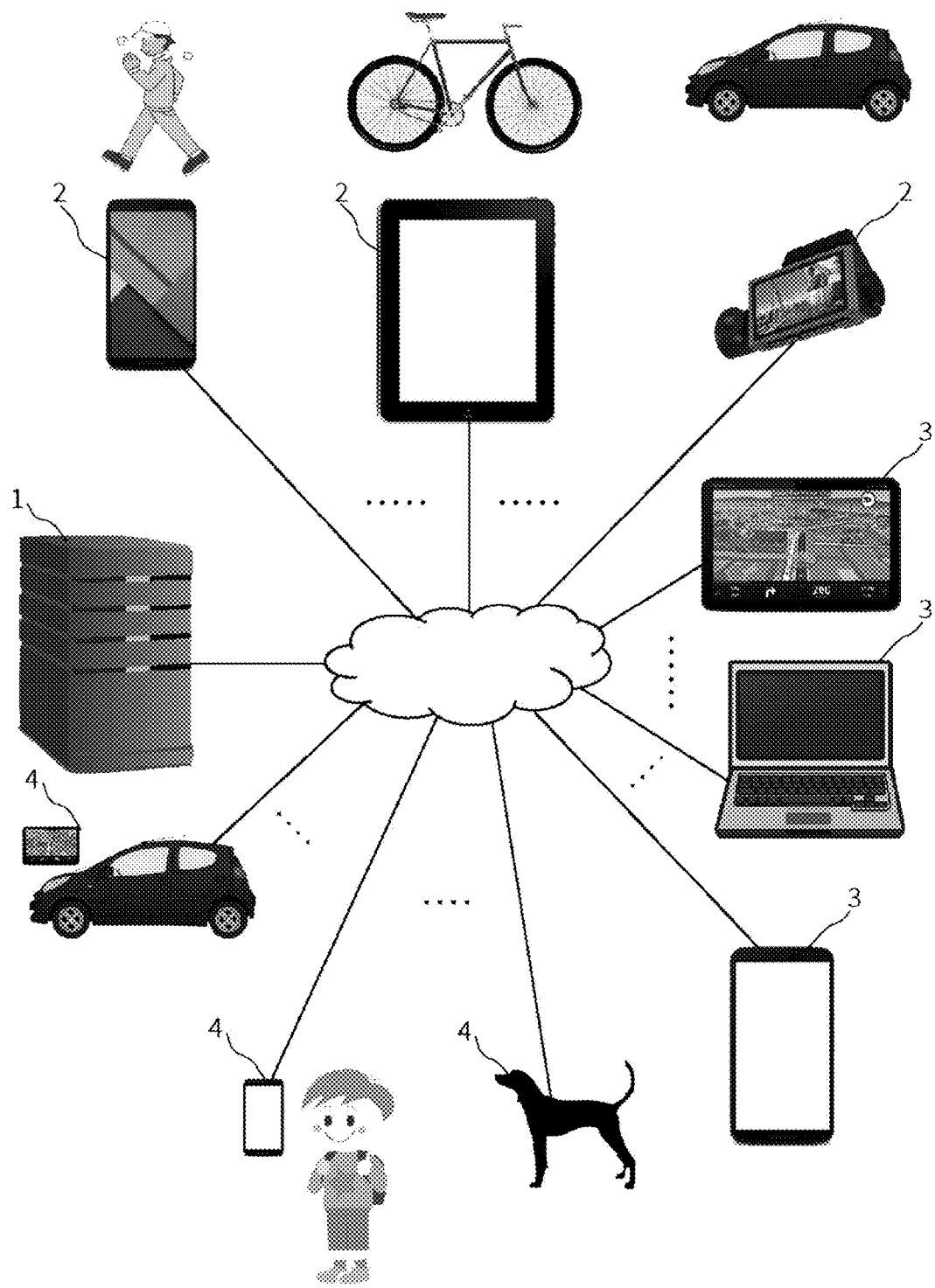
FIG. 1 is a conceptual diagram of an information system A in the first embodiment.

The following describes embodiments of an information processing device, etc. with reference to the figures. In the embodiments, components marked with the same reference numerals perform similar operations, so repeated descriptions may be omitted.

First Embodiment

Overview of First Embodiment

In this embodiment, an information system is described which includes an information processing device that uses position information of a target terminal which is the terminal of a target to be captured, acquires images captured by one or multiple mobile terminals, constructs a single image to be transmitted from the acquired images, and transmits the single image.

Overview of Information System A

FIG. 1 is a conceptual diagram of an information system A in this embodiment. The information system A includes an information processing device 1, one or multiple mobile terminals 2, one or multiple user terminals 3, and one or multiple target terminals 4.

The information processing device 1 is a server that provides a single image to the user terminal 3 using images transmitted by one or multiple mobile terminals 2. The information processing device 1 is, for example, a cloud server or an ASP server, but is not limited to a certain type. The information processing device 1 may also be a device that constitutes a blockchain. Since the information processing device 1 mainly performs processing related to images, the information processing device 1 may also be called an image processing device.

Here, the source images that constitute a single image are images captured by the mobile terminal 2, but may also include images captured by a camera that is fixed (hereinafter referred to as a fixed camera as appropriate). Further, the interval between shooting times of multiple still images included in a video is not particularly limited. The video is, for example, a 60 frames/second video or a 30 frames/second video, but may also be a set of multiple still images captured with a predetermined time (for example, 1 minute) or more therebetween, or a set of multiple still images captured when predetermined conditions are satisfied.

The mobile terminal 2 is a terminal installed on a moving object and is a terminal that captures images. The mobile terminal 2 is, for example, a drive recorder, a smartphone, a tablet terminal, or a camera with communication functions. Also, installation typically means being fixed, but may also include being in contact with or being held. The mobile terminal 2 may be, for example, a terminal held by a person. In addition, the mobile terminal 2 may have a driving means such as an engine or a moving means such as wheels. The mobile terminal 2 is a terminal that is not fixed to a structure or the ground. The moving object is an object that moves such as ground moving equipment, water surface moving equipment, underwater moving equipment, aerial moving equipment, space moving equipment, or a living organism. Ground moving equipment is, for example, a vehicle or a robot. Water surface moving equipment is, for example, a ship. Underwater moving equipment is, for example, a submarine. Aerial moving equipment is, for example, an aircraft or a drone. Space moving equipment is, for example, a rocket or an artificial satellite.

The user terminal 3 is a terminal used by a user. The user is a person who views images, a person who needs images, a person who watches over a target, etc. The user terminal 3 may have the functions of the mobile terminal 2. In other words, the user terminal 3 may also be a terminal of a user who provides images.

The target terminal 4 is a terminal that transmits position information. The target terminal 4 is, for example, a terminal equipped on a target. The target is a monitoring target or a shooting target. The target is, for example, a living organism or an object. A living organism is, for example, a human or an animal such as a pet. A human is, for example, a child or an elderly person. An object as a target is, for example, an item that one does not want to be stolen, such as an automobile, a motorcycle, or a bicycle. However, the monitoring target is not particularly limited.

The information processing device 1 and one or more mobile terminals 2 are typically capable of communicating via a network such as the Internet. In addition, the information processing device 1 and one or more user terminals 3 are typically capable of communicating via a network such as the Internet. Also, the information processing device 1 and one or more target terminals 4 are typically capable of communicating via a network such as the Internet. The user terminal 3 and the target terminal 4 are, for example, capable of communicating via a network such as the Internet.

Figure 2:
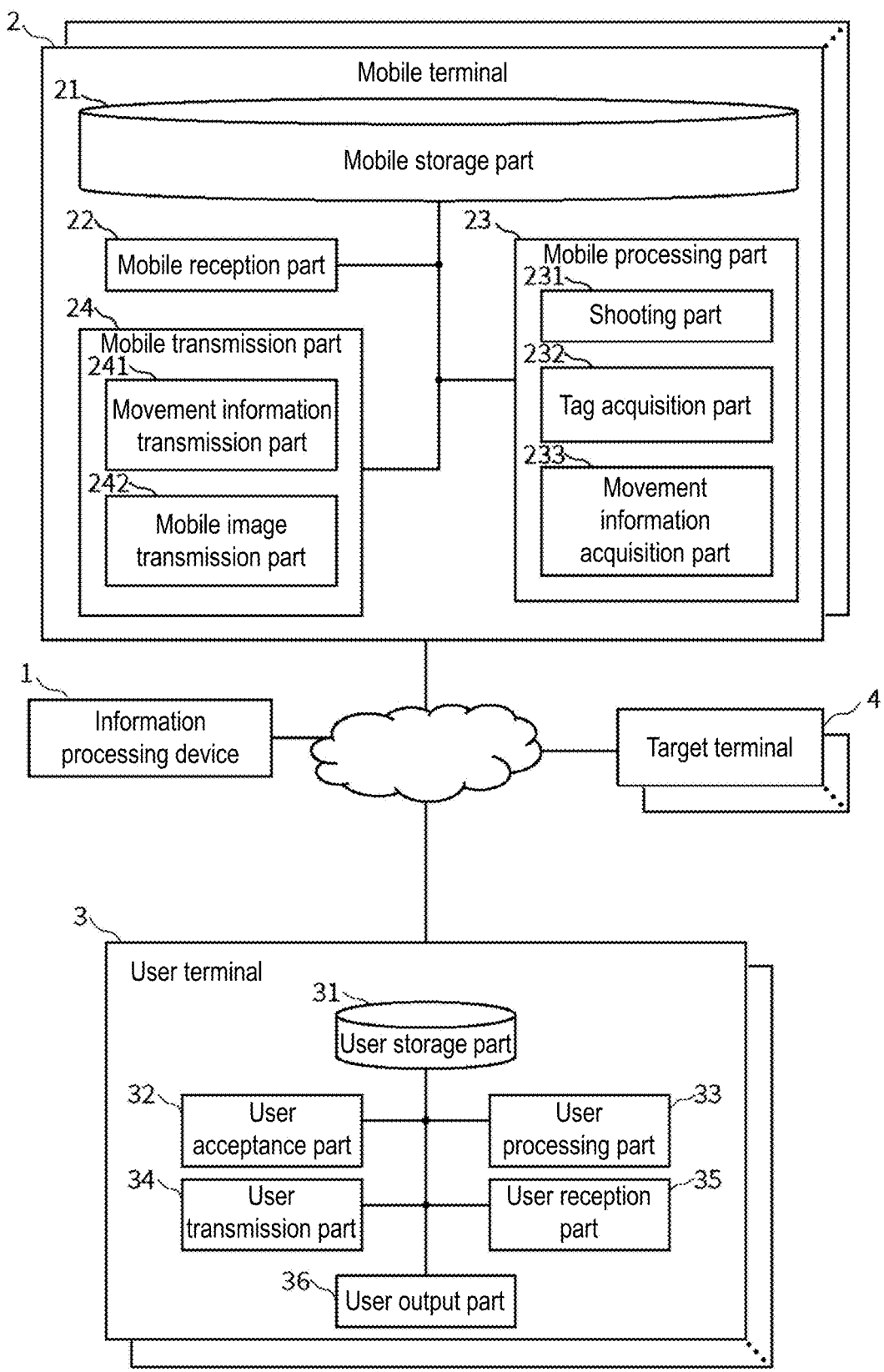
FIG. 2 is a block diagram of the information system A.
Figure 3:
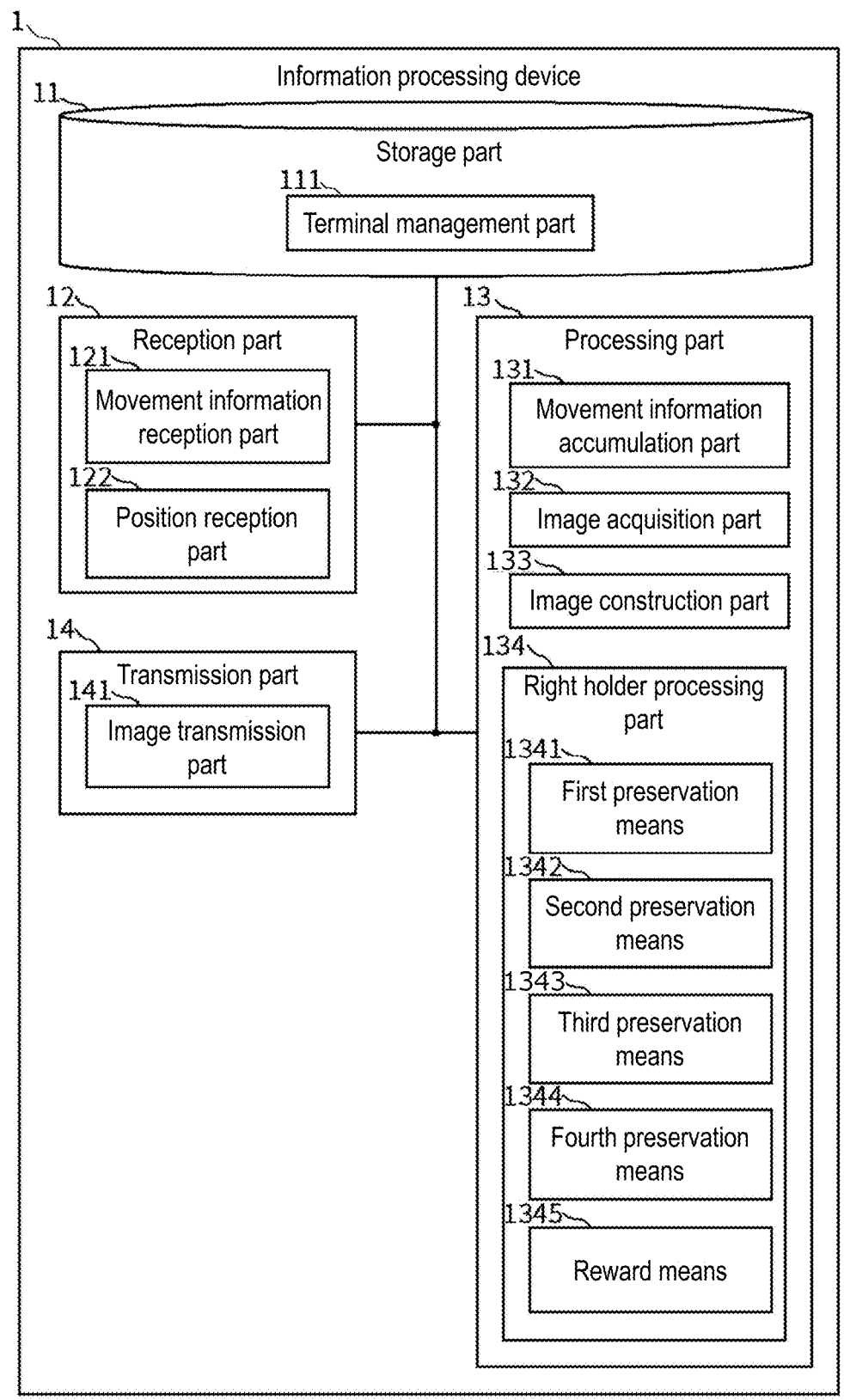
FIG. 3 is a block diagram of an information processing device 1.

FIG. 2 is a block diagram of the information system A in this embodiment. FIG. 3 is a block diagram of the information processing device 1.

Configuration Example of Each Device

The information processing device 1 includes a storage part 11, a reception part 12, a processing part 13, and a transmission part 14. The storage part 11 includes a terminal management part 111. The reception part 12 includes a movement information reception part 121 and a position reception part 122. The processing part 13 includes a movement information accumulation part 131, an image acquisition part 132, an image construction part 133, and a right holder processing part 134. The right holder processing part 134 includes a first preservation means 1341, a second preservation means 1342, a third preservation means 1343, a fourth preservation means 1344, and a reward means 1345. The transmission part 14 includes an image transmission part 141.

The mobile terminal 2 includes a mobile storage part 21, a mobile reception part 22, a mobile processing part 23, and a mobile transmission part 24. The mobile processing part 23 includes a shooting part 231, a tag acquisition part 232, and a movement information acquisition part 233. The mobile transmission part 24 includes a movement information transmission part 241 and a mobile image transmission part 242.

The user terminal 3 includes a user storage part 31, a user acceptance part 32, a user processing part 33, a user transmission part 34, a user reception part 35, and a user output part 36.

Details of Components of Information Processing Device 1

Various types of information are stored in the storage part 11 that constitutes the information processing device 1. The various types of information include, for example, terminal information described later, attribute value set described later, movement information described later, termination information described later, video, correspondence table, one or multiple pieces of fixed terminal information, combinations of attribute value tag conditions and tags described later, and combinations of image tag conditions and tags described later.

The correspondence table is a table that manages the correspondence between the target terminal 4 and the user terminal 3. The correspondence table can also be said to be a table that manages the relationship between the shooting target and the user. The correspondence table has, for example, multiple pieces of correspondence information that include an identifier of the target terminal 4 and an identifier of the user terminal 3.

The fixed terminal information refers to information related to a fixed terminal (not shown). The fixed terminal has a fixed camera and communication functions. The fixed terminal information includes a fixed terminal identifier and a fixed attribute value set. The fixed terminal information may be associated with an image. In addition, the fixed terminal identifier may be included in the fixed attribute value set. The fixed terminal identifier is information that identifies the fixed terminal. The fixed terminal identifier may be a right holder identifier that identifies the right holder who is the user of the fixed terminal. The fixed terminal identifier includes, for example, the ID of the fixed terminal, the name of the fixed terminal, the IP address of the fixed terminal, and the MAC address of the fixed terminal. The fixed attribute value set is a set of one or multiple fixed image attribute values. The fixed image attribute value refers to an attribute value of a fixed image. The fixed image attribute value includes, for example, environmental information and a tag. The fixed image attribute value is a dynamic attribute value that can change dynamically or a static attribute value that does not change dynamically. The static attribute value of the fixed terminal is, for example, position information and camera information. The dynamic attribute value of the fixed terminal is, for example, time information, weather information, temperature information, and seasonal information.

One or multiple pieces of terminal information are stored in the terminal management part 111. The terminal information refers to information related to the mobile terminal 2. The terminal information includes, for example, a terminal identifier and an attribute value set. The terminal information may be associated with an image captured by the mobile terminal 2. In addition, the terminal identifier may be included in the attribute value set.

The terminal identifier refers to information that identifies the mobile terminal 2. The terminal identifier may be a right holder identifier that identifies the right holder who is the user of the mobile terminal 2. The terminal identifier includes, for example, the ID of the mobile terminal 2, the user identifier of the user of the mobile terminal 2, the name of the mobile terminal 2, the IP address of the mobile terminal 2, and the MAC address of the mobile terminal 2.

The right holder refers to a person who has some rights related to an image. The right holder is, for example, the owner of the image, the copyright holder of the image, the owner of the mobile terminal 2 that captured the image, or the person with disposal rights to the image. The right holder is the initial right holder of the image. The right holder is typically the possessor of the mobile terminal 2, but may be any person who has rights to the image captured by the mobile terminal 2.

The right holder identifier refers to an identifier of the right holder of the image. The right holder identifier may be a terminal identifier. The right holder identifier includes, for example, the ID of the right holder, the name of the right holder, the email address of the right holder, and the telephone number of the right holder. The ID of the right holder is, for example, a user identifier.

The attribute value set refers to a set of one or multiple image attribute values. The image attribute value refers to an attribute value of an image. The image attribute value is, for example, environmental information. The image attribute value is, for example, a tag. The image attribute value is typically a dynamic attribute value that can change dynamically, but may also be a static attribute value that does not change dynamically.

The environmental information refers to information related to the environment in which an image is captured. The environmental information includes, for example, position information, direction information, camera information, time information, weather information, temperature information, and seasonal information. The position information refers to information that specifies a shooting position. The shooting position is the position of the camera that captures the image. The position information is, for example, (latitude, longitude) or (latitude, longitude, altitude). However, the position information may also include a region identifier that specifies a region on a map, an address, a road identifier that specifies a road, and a lane identifier that specifies a lane of a road. The direction information refers to information that specifies the direction of shooting. The direction information is, for example, an angle from true north. The camera information refers to information related to the camera. The camera information includes, for example, the angle of view and resolution. The time information refers to information that specifies the time at which the image was captured. The time at which the image was captured may be a time around the time when the image was captured, and accuracy may not be required. The time information includes, for example, time, year/month/day/hour, year/month/day/hour/minute, year/month/day/hour/minute/second, year/month/day, and month/day. In other words, the granularity of time indicated by the time information is not particularly limited. The weather information refers to information that specifies the weather at the time when the image was captured in the place where the image was captured. The weather information includes, for example, "sunny," "rainy," "snowy," and "cloudy." The temperature information refers to information that specifies the outside temperature at the time when the image was captured in the place where the image was captured. The temperature information is, for example, "25 degrees" or "30 degrees or higher." The seasonal information refers to information that specifies the season at the time when the image was captured in the place where the image was captured. The seasonal information includes, for example, "spring," "summer," "early summer," and "winter."

The tag refers to information that specifies the characteristics of an image. The tag is, for example, information resulting from analyzing an image. The tag is, for example, information resulting from analyzing one or multiple moving object attribute values. The tag is, for example, information resulting from analyzing multiple moving object attribute values in a time series.

The moving object attribute value refers to an attribute value related to a moving object. The moving object attribute value is, for example, information related to movement that can be acquired while the moving object is moving. The moving object attribute value includes, for example, CAN (Controller Area Network) data and information indicating the use of an airbag. The CAN data includes, for example, speed, rotation speed of the engine, and state of the brake. The tag includes, for example, "accident," "traffic jam," "dangerous driving," "speeding," and the name of a subject appearing in the image (for example, "person," "bear," or the name of a celebrity).

The position information, direction information, time information, weather information, temperature information, and seasonal information of the image attribute value are dynamic attribute values. On the other hand, the camera information is a static attribute value.

The reception part 12 receives various types of information and instructions from the mobile terminal 2, the user terminal 3, or the target terminal 4. The various types of information and instructions include, for example, movement information, termination information, position information, inquiry, attribute value set, image, purchase instruction, and viewing instruction.

The purchase instruction refers to an instruction to purchase an image. The purchase instruction is associated with a user identifier. The purchase instruction typically includes information that specifies an image. The purchase instruction has, for example, an image identifier. The purchase instruction includes, for example, an inquiry. The purchase instruction includes, for example, a purchase condition. The purchase condition is, for example, a purchase amount. The purchase condition includes, for example, information that specifies a right period.

The viewing instruction refers to an instruction for viewing an image. The viewing instruction is associated with a user identifier. The viewing instruction is associated with an image identifier that specifies the image.

The reception part 12 receives an image from the mobile terminal 2. The reception part 12, for example, receives an image from the mobile terminal 2 that has accepted the permission of the user in response to a usage pattern flag stored in the mobile terminal 2.

The usage pattern flag refers to information that specifies the stance of the right holder of the image in a case where a third party uses the image. The usage pattern flag is, for example, information indicating "there is a desire for actual use" or information indicating "provisional use is acceptable." Actual use refers to use that is not provisional. The usage pattern flag is, for example, information indicating "permission from the right holder is required for a third party's use of the image" or information indicating "permission from the right holder is not required for a third party's use of the image."

For example, in a case where the usage pattern flag stored in the mobile terminal 2 is information indicating "there is a desire for actual use that is not provisional," the reception part 12 receives an image from the mobile terminal 2 only when the mobile terminal 2 has accepted the permission of the user.

It is preferable that the image received by the reception part 12 is associated with a right holder identifier that identifies the right holder of the image. The image received by the reception part 12 is, for example, associated with one or multiple image attribute values.

The reception part 12 may receive an image captured by a fixed camera (not shown) from a fixed terminal (not shown). The fixed terminal acquires and transmits the image captured by the fixed camera.

The movement information reception part 121 receives movement information from the mobile terminal 2 at the time of start of movement of the mobile terminal 2. The time of start is preferably immediately after the start, but may also be after a predetermined time (for example, 1 minute) has elapsed from the start of movement. The movement information reception part 121 typically receives movement information associated with the terminal identifier of the mobile terminal 2.

The movement information refers to information specifying that the mobile terminal 2 moves. The information specifying the movement may be information specifying that movement has started. The movement here may be about to move or may be in the process of moving. The movement information is, for example, a movement start flag or a terminal identifier. The movement start flag is information indicating that movement starts. Starting movement is, for example, turning ON an engine or starting shooting. The terminal identifier is an identifier of the mobile terminal 2 that starts movement. The terminal identifier may be the same as the right holder identifier.

The movement information reception part 121 receives termination information from the mobile terminal 2 at the time of end of movement of the mobile terminal 2. The time of end is preferably immediately before the end, but may also be after the end of movement, etc. The movement information reception part 121 typically receives termination information associated with the terminal identifier of the mobile terminal 2.

The termination information refers to information specifying that the mobile terminal 2 stops moving. The termination information is information indicating that images cannot be transmitted. The termination information is, for example, a movement end flag or a terminal identifier. The movement end flag is information indicating that movement ends. Ending movement is, for example, turning OFF an engine or turning OFF the power of the mobile terminal 2. The terminal identifier is an identifier of the mobile terminal 2 that ends movement.

The position reception part 122 receives position information of the target terminal 4. The position reception part 122 typically receives position information of the target terminal 4 that is moving. The position reception part 122, for example, sequentially receives multiple pieces of position information at different times of the target terminal 4. The position information of the target terminal 4 refers to information that specifies the position of the target terminal 4. The position information is, for example, (latitude, longitude) or (latitude, longitude, altitude), but may also be an ID that specifies the position, and is not particularly limited.

The position reception part 122 may receive position information from the target terminal 4, or may receive position information from the user terminal 3, etc. that has received the position information from the target terminal 4.

The processing part 13 performs various types of processing. The various types of processing refer to, for example, processing performed by the movement information accumulation part 131, the image acquisition part 132, the image construction part 133, and the right holder processing part 134. The processing part 13 may perform the same processing as the tag acquisition part 232 described later.

In a case of receiving a purchase instruction, the processing part 13 acquires a user identifier corresponding to the user terminal 3 that transmits the purchase instruction, and accumulates the user identifier in pair with the image identifier included in the purchase instruction. Such a user identifier is an identifier of a new right holder of the image. In addition, such processing may also be performed by the fourth preservation means 1344.

In a case of receiving a viewing instruction, the processing part 13 acquires an image identified by the image identifier included in the viewing instruction, and transmits the image to the user terminal 3 that transmits the viewing instruction.

The movement information accumulation part 131 accumulates the movement information received by the movement information reception part 121 in association with the mobile terminal 2. Associating with the mobile terminal 2 is, for example, associating with a right holder identifier. The right holder identifier may be a terminal identifier. The movement information accumulation part 131 accumulates, for example, the movement information in the terminal management part 111. In response to the movement information reception part 121 receiving termination information, for example, the movement information accumulation part 131 deletes the movement information paired with the right holder identifier corresponding to the termination information. In response to the movement information reception part 121 receiving termination information, for example, the movement information accumulation part 131 accumulates the termination information in association with the mobile terminal 2.

The image acquisition part 132 acquires images captured by one or more mobile terminals 2. The images acquired by the image acquisition part 132 are typically associated with an attribute value set. The attribute value set includes one or more pieces of environmental information. It is preferable that the one or more pieces of environmental information include position information that specifies the shooting position. It is preferable that the one or more pieces of environmental information include time information that specifies the shooting time. It is also preferable that the right holder identifier of the mobile terminal 2 is associated with the image.

The image acquisition part 132 typically acquires images from the mobile terminal 2 that captures a region corresponding to the position information received by the position reception part 122. The mobile terminal 2 that captures the region may be broadly interpreted as a mobile terminal 2 that would have captured the region. In other words, there may be cases where the mobile terminal 2 exists at a position where the mobile terminal 2 could capture a target, but the target corresponding to the position information received by the position reception part 122 is not shown in the image transmitted from the mobile terminal 2. The image acquisition part 132 typically acquires images from one or multiple mobile terminals 2 that capture regions corresponding to multiple pieces of individual position information received by the position reception part 122.

The image acquisition part 132, for example, sequentially acquires multiple images that match a position condition, each from different mobile terminals 2.

The position condition refers to capturing a region that includes the position information of the target terminal 4, or being likely to capture the region. The position condition is, for example, that the distance between the position information of the target terminal 4 and the position information of the mobile terminal 2 is within or less than a threshold value. The position condition is, for example, that the position indicated by the position information of the target terminal 4 is included in the shooting range specified using the position information of the mobile terminal 2, the angle of view of the camera of the mobile terminal 2, and the direction information of the camera. The position condition is, for example, that the position indicated by the position information of the target terminal 4 is included in the shooting range specified using the position information of the mobile terminal 2, the angle of view of the camera of the mobile terminal 2, and the direction information of the camera, and that the distance between the position information of the mobile terminal 2 and the position information of the target terminal 4 is within or less than a threshold value.

The shooting range is the range indicated by range specification information. The range specification information is information that specifies a region obtained using one piece of position information of the mobile terminal 2 transmitted from the mobile terminal 2, or using that one piece of position information along with the angle of view and direction information of the camera of the mobile terminal 2. The information specifying such a region is typically a set of multiple pieces of position information. Camera information including the angle of view and direction information of the camera of the mobile terminal 2 is stored in the terminal management part 111 in association with the terminal identifier. The processing to acquire the range specification information that specifies the range captured by the camera using the position information, angle of view, and direction information of the camera is known processing.

In a case where the position information received by the position reception part 122 is determined not to be within the shooting range of the image transmitted from the mobile terminal 2, the image acquisition part 132, for example, acquires an image from another mobile terminal 2 that captures a region corresponding to the position information. Such determination is preferably performed by the image acquisition part 132, but may also be performed by the mobile terminal 2.

The image acquisition part 132, for example, acquires images from the mobile terminal 2 by any of the following three methods.

(1) Inquiry Method

The inquiry method is a method in which one or multiple mobile terminals 2 are inquired as to whether they satisfy the position condition for the position information of the target terminal 4 received by the position reception part 122.

The image acquisition part 132 constructs an inquiry having the position information of the target terminal 4 received by the position reception part 122, transmits the inquiry to one or multiple mobile terminals 2, and receives images from one or multiple mobile terminals 2 determining that they satisfy the position condition for the position information. It is preferable that the mobile terminal 2 to which the image acquisition part 132 transmits the inquiry is a mobile terminal 2 corresponding to the movement information. The mobile terminal 2 corresponding to the movement information is a terminal capable of transmitting images. The mobile terminal 2 corresponding to the movement information is typically a moving terminal.

(2) Confirmation Method

The confirmation method is a method in which the image acquisition part 132 determines one or more mobile terminals 2 that satisfy the position condition for the position information of the target terminal 4.

In such a case, the position information or range specification information of each of one or more mobile terminals 2 is stored in the terminal management part 111. In addition, it is preferable that the position information or range specification information in the terminal management part 111 is updated constantly or periodically, and is the latest position information or the latest range specification information of the mobile terminal 2. In addition, it is preferable that the position information in the terminal management part 111 is associated with the angle of view and direction information of the camera.

The image acquisition part 132 refers to the terminal management part 111 and determines one or more mobile terminals 2 that satisfy the position condition for the position information of the target terminal 4 received by the position reception part 122. Next, the image acquisition part 132 transmits a transmission request for images to the one or more mobile terminals 2, and receives images from each of the one or more mobile terminals 2. It is preferable that the transmission request has the position information of the target terminal 4.

In a case where the image acquisition part 132 receives images from multiple mobile terminals 2, it is preferable to select one image using one or more image attribute values included in the attribute value set of the mobile terminals 2. For example, the image acquisition part 132 selects an image of the mobile terminal 2 corresponding to the position information closest to the position information of the target.

(3) Search Method

The search method is a method for searching, from among images received from each of one or more mobile terminals 2, for an image that captures a region corresponding to the position information received by the position reception part 122.

In such a case, the mobile terminal 2 voluntarily transmits an image to the information processing device 1 in association with the attribute value set. The attribute value set includes, for example, position information, or position information with angle of view and direction information, or range specification information. In addition, the reception part 12 receives the image and the attribute value set from the mobile terminal 2. Next, the processing part 13 accumulates the image and the attribute value set in the storage part 11 in association with the right holder identifier.

Then, the image acquisition part 132 acquires, from the storage part 11, the image corresponding to the image attribute value that satisfies the position condition for the position information of the target terminal 4 received by the position reception part 122.

The image construction part 133 constructs a single image to be transmitted using the images acquired by the image acquisition part 132. Constructing a single image may simply be acquiring a single image.

The image construction part 133, for example, constructs a single image using multiple images acquired by the image acquisition part 132. For example, the image construction part 133 constructs a single image by connecting multiple images sequentially acquired by the image acquisition part 132 in a time series.

The image construction part 133 explicitly indicates the position of the target terminal 4 within the frame of the image acquired by the image acquisition part 132, and constructs a single image. Explicitly indicating the position is, for example, adding a shape such as circle or rectangle, or an arrow, at the position indicated by the position information of the target within the frame.

The following describes further specific examples of the processing of the image construction part 133. The image construction part 133 performs (1) temporal combination of images, or (2) spatial combination of images, or both (1) and (2).

(1) Temporal Combination of Images

The image construction part 133, for example, temporally combines multiple images to construct a single image.

The image construction part 133, for example, temporally combines multiple images with different time information corresponding to multiple images acquired by the image acquisition part 132, to construct a single image. Temporally combining multiple images to construct a single image may be sequentially passing the multiple images to the image transmission part 141. In other words, temporally combining multiple images to construct a single image means that the user perceives the multiple images as a single image as a result.

The image construction part 133, for example, combines multiple images acquired by the image acquisition part 132 in the order the images are received, to construct a single image. The image construction part 133, for example, acquires parts of multiple images acquired by the image acquisition part 132, and sequentially combines these parts to construct a single image. Temporally combining multiple images typically means sequentially combining parts of images captured by the mobile terminal 2. Sequentially combining parts of images may be sequentially passing parts of the images to the image transmission part 141. Additionally, combining in the order of time corresponding to the images is combining images in the order of time indicated by the time information corresponding to the images, or combining images in the order the images are received.

(2) Spatial Combination of Images

The image construction part 133, for example, spatially fuses parts of multiple images acquired by the image acquisition part 132 to construct a single image. The image construction part 133, for example, uses some or all of the frames constituting multiple images acquired by the image acquisition part 132 to construct a single frame, and temporally connects multiple frames to construct a single image.

The image construction part 133, for example, constructs a single image having multiple frames that are spatially fused from at least part of frames possessed by one image and at least part of frames possessed by another image.

The processing to spatially fuse frames included in multiple images includes, for example, the following processing (a) and (b).

(a) Method Based on Image Processing

The image construction part 133, for example, performs processing to align the directions and scales of multiple frames to be subjected to spatial connection processing. Next, the image construction part 133, for example, detects identical regions in multiple frames. Next, the image construction part 133, for example, performs processing to overlay multiple frames having identical regions, and constructs a single wide-area frame. Identical regions in multiple frames may be detected using known technology.

(b) Method Based on Machine Learning

The image construction part 133, for example, provides multiple frames and a learning model to a module that performs prediction processing of machine learning, executes the module, and acquires a single wide-area frame.

The learning model is obtained by providing multiple pieces of training data, which use multiple frames as explanatory variables and a single wide-area frame constructed from the multiple frames as an objective variable, to a module that performs learning processing of machine learning, and executing the module.

Furthermore, the learning model may be referred to as a learner, classifier, classification model, etc. While deep learning is preferable as the machine learning algorithm, random forest, etc. may also be used. For machine learning, various machine learning functions or various existing libraries can be used, such as TensorFlow library, R language's random forest module, etc.

The right holder processing part 134 performs right holder processing. The right holder processing refers to processing related to the rights of an image. The right holder processing refers to, for example, processing related to a right holder identified by a right holder identifier associated with an image constructed by the image construction part 133. The right holder processing includes, for example, the first preservation processing described later, the second preservation processing described later, the third preservation processing described later, the fourth preservation processing described later, and the reward processing described later.

The right holder processing part 134 performs, for example, right holder processing, which is processing in response to the image transmission part 141 transmitting an image, and is processing related to a right holder identified by a right holder identifier associated with the image.

The right holder identifier associated with an image is, for example, a right holder identifier associated with each of the multiple images that are the source of the constructed image, or a user identifier for the user terminal 3 to which the image is transmitted.

The right holder processing part 134, for example, accumulates the image acquired by the image acquisition part 132 in association with the right holder identifier. The right holder identifier typically includes the right holder identifier of the right holder of the source image, or the right holder identifier of the right holder of an image.

The first preservation means 1341 performs first preservation processing to accumulate an image constructed by the image construction part 133 in association with the attribute value sets associated with multiple images that are the source of the image. The first preservation means 1341 may also perform first preservation processing to accumulate an image transmitted from the mobile terminal 2 in association with the attribute value set associated with the image.

The second preservation means 1342 performs second preservation processing to accumulate an image constructed by the image construction part 133 in association with the right holder identifiers corresponding to multiple images that are the source of the image.

The first preservation means 1341 or the second preservation means 1342 may accumulate an image constructed by the image construction part 133 in association with the attribute value sets associated with multiple images that are the source of the image, and the right holder identifiers corresponding to multiple images that are the source of the image.

The third preservation means 1343 accumulates an image constructed by the image construction part 133 in association with the right holder identifier that identifies the user of the user terminal 3. Here, the user of the user terminal 3 is the person viewing the image. The user terminal 3 here is the user terminal 3 corresponding to the target terminal 4 of the target appearing in the image. The user terminal 3 here is, for example, the terminal of a parent of a child who is to be watched over, or the terminal of a caregiver of an elderly person who is to be watched over.

Additionally, the destination for accumulating the image is, for example, the storage part 11, but may also be another device, or other devices constituting a blockchain. Also, the accumulated image is typically associated with the image identifier that identifies the image.

The fourth preservation means 1344 performs fourth preservation processing to accumulate preservation information including access information for accessing an accumulated image. The accumulation of the image and the fourth preservation processing for the preservation information corresponding to the image are not limited to a certain order.

The fourth preservation means 1344 performs, for example, fourth preservation processing to accumulate preservation information, which is constructed by the image construction part 133 and includes access information for accessing an accumulated image, in a blockchain.

It is preferable that the fourth preservation means 1344 accumulates the preservation information in a blockchain. In other words, it is preferable that the fourth preservation means 1344 accumulates the preservation information in a distributed ledger of the blockchain. It is preferable that the fourth preservation means 1344 registers the preservation information as an NFT (non-fungible token). It is preferable that the fourth preservation means 1344 registers the preservation information in a distributed file system in an IPFS (Inter Planetary File System) network.

The preservation information refers to information for ensuring the originality of an image. The preservation information can be said to be heading information of the image. The preservation information is, for example, access information and an attribute value set. It is preferable that the preservation information includes one or multiple right holder identifiers. In a case where the preservation information includes multiple right holder identifiers, the right holder of the image may be shared, or the multiple right holder identifiers may be right holder history information. The right holder history information refers to a set of right holder identifiers and is information indicating the history of right holders. Through the fourth preservation processing, the originality of the preservation information of the registered image can be guaranteed. By guaranteeing the originality of the preservation information, the originality of the image corresponding to the preservation information is also guaranteed. The access information refers to information for accessing an image. The access information is information that specifies the accumulation destination of the image. The access information is, for example, a URL or URI.

It is preferable that the preservation information includes information (which may also be called a flag) indicating whether the image can be provided to a third party. The flag is, for example, information indicating that a third party can view the image, information indicating that the image can be sold, or information indicating that neither viewing nor selling is permitted.

The reward means 1345, for example, performs reward processing for each right holder identified by the right holder identifier associated with each of multiple images that are the source of an image constructed by the image construction part 133.

The reward processing refers to processing for giving a reward. The reward processing is, for example, processing that increases points managed in pair with one or multiple right holder identifiers associated with an image. The reward processing is, for example, processing that deposits money to a right holder identified by one or multiple right holder identifiers associated with an image. The reward processing is, for example, processing that transmits an image or other contents to the user terminal 3 of the right holder identified by one or multiple right holder identifiers associated with an image. The reward processing may be any processing as long as a benefit is given to the right holder identified by one or multiple right holder identifiers associated with an image, and the contents thereof are not particularly limited. In addition, the reward may be, for example, money, points, goods, content, etc., and the contents thereof are not particularly limited.

It is preferable that the reward means 1345 acquires an attribute value set corresponding to each of multiple images that are the source of an image transmitted by the image transmission part 141, determines the reward for each of multiple right holders using the attribute value set, and performs reward processing which is processing to give the reward.

The attribute value set here includes, for example, the data amount of the image, the time of the image, the number of frames of the image, and the resolution of the image.

It is preferable that the reward means 1345 acquires a reward amount corresponding to a service identifier that identifies a service performed on the target image, and performs reward processing which is processing to give a reward corresponding to the reward amount. The service identifier is, for example, "viewing" or "purchase." In such a case, for example, the storage part 11 stores the reward amount corresponding to the service identifier, or information for determining the reward amount corresponding to the service identifier.

The reward means 1345, for example, uses one or multiple pieces of information among the attribute value set and the service identifier to acquire a reward amount, and performs reward processing which is processing to give a reward corresponding to the reward amount. In such a case, for example, the storage part 11 stores a calculation formula or a reward correspondence table corresponding to each of multiple service identifiers. The calculation formula is a formula that calculates the reward amount with one or multiple image attribute values included in the attribute value set as parameters. The reward correspondence table is a table having multiple pieces of reward correspondence information that manage the reward amount corresponding to one or multiple image attribute values.

The reward means 1345 typically performs processing to make the user who enjoys the service related to the target image bear the reward.

The processing to make the user bear the reward is, for example, processing to charge the user for the portion of the reward amount acquired. The processing to make the user bear the reward is, for example, processing to charge the user for the portion of the reward amount acquired and the portion of profit gained by the operator side of the information processing device 1. The processing to make the user bear the reward includes, for example, processing to reduce points corresponding to the user who enjoys the service, settlement processing using the credit card number of the user, etc.

The transmission part 14 transmits various types of information or instructions to the mobile terminal 2 or the user terminal 3. The various types of information or instructions include, for example, images, inquiries, and transmission requests.

The image transmission part 141 transmits one image based on the images acquired by the image acquisition part 132. One image based on the images acquired by the image acquisition part 132 refers to one image combined from multiple images acquired by the image acquisition part 132, or one image acquired by the image acquisition part 132. The image transmission part 141, for example, transmits one image combined from multiple images acquired by the image acquisition part 132. The image transmission part 141, for example, transmits one image constructed by the image construction part 133.

The image transmission part 141, for example, transmits one image to the user terminal 3 that is paired with the target terminal 4. The image transmission part 141, for example, refers to the correspondence table in the storage part 11, determines the user terminal 3 corresponding to the target terminal 4, and transmits one image to the user terminal 3.

Details of Components of Mobile Terminal 2

Various types of information are stored in the mobile storage part 21 that constitutes the mobile terminal 2. The various types of information include, for example, images, attribute value sets, right holder identifiers, movement information, termination information, combinations of attribute value tag conditions and tags, combinations of image tag conditions and tags, and usage pattern flags. Typically, one or multiple combinations of attribute value tag conditions and tags are stored in the mobile storage part 21. Typically, one or multiple combinations of image tag conditions and tags are stored in the mobile storage part 21. It is preferable that the attribute value set has position information, the angle of view of the camera which is the shooting part 231, and direction information of the camera.

One or more image attribute values constituting an attribute value set are associated with one or more still images (which may also be called fields or frames) that constitute an image. The one or more image attribute values may be associated with all still images, with one still image, or with multiple still images.

The attribute value tag condition refers to a condition for acquiring a tag based on one or multiple moving object attribute values. The attribute value tag condition is a condition related to one or multiple moving object attribute values. The attribute value tag condition includes, for example, "one or multiple pieces of position information indicating a specific position or region," "a sudden brake is applied," "the degree of deceleration of speed within a unit time (acceleration) is equal to or less than a threshold value (a sudden brake is applied)," "an airbag is activated," "a time with speed equal to or less than a first speed has elapsed for more than a second time (there is a traffic jam)," and "position information corresponds to a specific name." The tag paired with the attribute value tag condition includes, for example, "a name indicating a specific position or region (for example, point name, region name, scenic spot name)," "abnormal driving," "accident," "traffic jam," and "specific point name."

The image tag condition refers to a condition related to an image. The image tag condition is a condition based on the analysis result of the image. The image tag condition includes, for example, "having a still image in which a car and a person are in contact (there is an accident)" and "there is no sidewalk on the road (it is a dangerous road)." The tag paired with the image tag condition includes, for example, "accident" and "danger."

The mobile reception part 22 receives various types of information. The various types of information include, for example, inquiries and transmission requests.

The mobile processing part 23 performs various types of processing. The various types of processing include, for example, processing performed by the shooting part 231, the tag acquisition part 232, and the movement information acquisition part 233. The mobile processing part 23 structures the information received by the mobile reception part 22 into a data structure for output.

The mobile processing part 23, for example, determines an attribute value set that matches an inquiry received by the mobile reception part 22, and acquires an image paired with the attribute value set. The mobile processing part 23, for example, acquires an image being captured. The mobile processing part 23, for example, acquires an image from the mobile storage part 21. The attribute value set that matches the inquiry typically has position information that satisfies the position condition for the position information included in the inquiry. The attribute value set that matches the inquiry typically has position information, angle of view, and direction information that specify a shooting range including the position indicated by the position information included in the inquiry. Here, in a case where the mobile processing part 23 cannot determine an attribute value set that matches the inquiry received by the mobile reception part 22, the mobile processing part 23 does not acquire an image.

In a case where the mobile reception part 22 receives a transmission request for an image, the mobile processing part 23, for example, acquires an image captured by the shooting part 231. In a case where the mobile reception part 22 receives a transmission request including position information, the mobile processing part 23, for example, acquires an image corresponding to the position information from the mobile storage part 21. Such position information is the position information of the target terminal 4. In addition, the image corresponding to the position information is an image including a frame paired with position information that satisfies the position condition for the position information.

The mobile processing part 23, for example, acquires an attribute value set during shooting. The mobile processing part 23 accumulates the acquired attribute value set in the mobile storage part 21. Further, the mobile processing part 23, for example, associates the acquired attribute value set with an image. Associating with an image is typically associating with a frame constituting the image. It is preferable that the attribute value set and the frame are temporally synchronized.

The attribute value set is, for example, one or more pieces of environmental information. The environmental information includes, for example, position information, time information, weather information, temperature information, and seasonal information.

The mobile processing part 23 typically acquires position information during shooting. For example, the mobile processing part 23 having the functions of a GPS receiver acquires position information. The mobile processing part 23, for example, acquires position information constantly or at predetermined intervals.

The mobile processing part 23, for example, acquires time information from a clock (not shown) during shooting. The mobile processing part 23, for example, acquires time information constantly, at predetermined intervals, or in a case where an acquisition condition is satisfied.

The mobile processing part 23, for example, acquires time information from a clock (not shown) during shooting, and acquires seasonal information corresponding to the time information.

The mobile processing part 23, for example, acquires weather information during shooting. The mobile processing part 23, for example, acquires weather information corresponding to position information from a server (not shown). The mobile processing part 23, for example, acquires weather information constantly, at predetermined intervals, or in a case where an acquisition condition is satisfied.

The mobile processing part 23, for example, acquires temperature information during shooting. The mobile processing part 23, for example, acquires temperature information corresponding to position information from a server (not shown). The mobile processing part 23, for example, acquires temperature information from a temperature sensor installed on the moving object. The mobile processing part 23, for example, acquires temperature information constantly, at predetermined intervals, or in a case where an acquisition condition is satisfied.

It is preferable that the mobile processing part 23, for example, includes a microphone, acquires audio information, and stores the audio information in association with the image acquired by the shooting part 231. Such a function is, for example, a function of a drive recorder.

The shooting part 231 captures images. The shooting part 231, for example, starts shooting after detecting the start of movement. In addition, it is preferable that the shooting part 231 continues shooting, for example, until detecting the end of movement.

It is preferable that the shooting part 231 accumulates the captured images in the mobile storage part 21. In a case of accumulating images in the mobile storage part 21 with limited memory capacity, the shooting part 231 preferably overwrites new images in regions where old images are stored. In other words, the structure of the mobile storage part 21 is preferably a ring buffer structure.

The tag acquisition part 232 acquires one or more tags for the image captured by the shooting part 231, and associates the one or more tags with the image.

The tag acquisition part 232, for example, analyzes the image captured by the shooting part 231 and acquires one or more tags for the image.

The movement information acquisition part 233 detects the movement of the mobile terminal 2 and acquires movement information, for example, at the start of the movement. The movement information acquisition part 233, for example, acquires movement information that is the right holder identifier of the mobile storage part 21. The movement information acquisition part 233, for example, acquires the movement information of the mobile storage part 21. The movement information is, for example, the right holder identifier and information indicating "that movement has started." In addition, the detection of the movement of the mobile terminal 2 is, for example, the detection of the engine being turned ON or the detection of the power of the mobile terminal 2 being turned ON.

The mobile transmission part 24 transmits various types of information to the information processing device 1. The various types of information include, for example, movement information, termination information, images, and attribute value sets.

The movement information transmission part 241 typically transmits the movement information acquired by the movement information acquisition part 233 to the information processing device 1 at the start of movement. In a case where the movement ends, the movement information transmission part 241 transmits termination information to the information processing device 1.

The mobile image transmission part 242 transmits an image captured by the shooting part 231 to the information processing device 1. The timing at which the mobile image transmission part 242 transmits an image is not particularly limited. For example, after the mobile processing part 23 acquires an image paired with the attribute value set that matches the received inquiry, the mobile image transmission part 242 transmits the image to the information processing device 1. The mobile image transmission part 242, for example, in response to receiving a transmission request, transmits to the information processing device 1 the image being captured or an image corresponding to the transmission request. In a case where the shooting part 231 captures an image, the mobile image transmission part 242, for example, constantly transmits the image to the information processing device 1.

It is preferable that the mobile transmission part 24 transmits images captured by the shooting part 231 to the information processing device 1 without transmitting the audio information acquired by the mobile processing part 23. This is because audio information may include voice information of the driver or passenger in the moving object, and transmitting such audio information to the information processing device 1 and providing such audio information to the user terminal 3, etc. may threaten the privacy of the driver or passenger, which is not appropriate.

Details of Components of User Terminal 3

Various types of information are stored in the user storage part 31 that constitutes the user terminal 3. The various types of information include, for example, user identifiers and images.

The user acceptance part 32 accepts various instructions and information. The various instructions and information include, for example, purchase instructions and viewing instructions.

The user processing part 33 performs various types of processing. The various types of processing include, for example, processing to structure various instructions and information received by the user acceptance part 32 into a data structure for transmission. The various types of processing include, for example, processing to structure information received by the user reception part 35 into a structure for transmission.

The user transmission part 34 transmits various instructions and information to the information processing device 1. The various instructions and information include, for example, purchase instructions, viewing instructions, and position information received from the target terminal 4.

The user reception part 35 receives various types of information and instructions. The various types of information and instructions include, for example, position information of the target terminal 4 and images. The user reception part 35, for example, receives images corresponding to the transmitted viewing instructions from the information processing device 1. The user output part 36 outputs various types of information. The various types of information include, for example, images.

Here, output refers to a concept that includes display on a display, projection using a projector, printing with a printer, audio output, transmission to an external device, accumulation on a recording medium, transfer of processing results to other processing devices or other programs, etc.

Description of Operation of Target Terminal 4

The target terminal 4 acquires and transmits position information that specifies the position of the target terminal 4. The target terminal 4 transmits the position information to, for example, the information processing device 1 or the user terminal 3. It is preferable that the target terminal 4 transmits the position information paired with a target identifier. The target identifier refers to information that identifies the target. The target identifier includes, for example, ID, name, telephone number, email address, and MAC address of the target terminal 4. The target terminal 4 acquires the position information using, for example, a GPS receiver, but the method of acquiring the position information is not particularly limited.

The storage part 11, the terminal management part 111, the mobile storage part 21, and the user storage part 31 are preferably non-volatile recording media, but can also be implemented with volatile recording media.

The process by which information is stored in the storage part 11, etc. is not particularly limited. For example, information may be stored in the storage part 11, etc. via a recording medium, or information transmitted via a communication line or the like may be stored in the storage part 11, etc., or information input via an input device may be stored in the storage part 11, etc.

The reception part 12, the movement information reception part 121, the position reception part 122, the mobile reception part 22, and the user reception part 35 are typically implemented with wireless or wired communication means, but may also be implemented with means for receiving broadcasts.

The processing part 13, the movement information accumulation part 131, the image acquisition part 132, the image construction part 133, the right holder processing part 134, the first preservation means 1341, the second preservation means 1342, the third preservation means 1343, the fourth preservation means 1344, the reward means 1345, the mobile processing part 23, the tag acquisition part 232, the movement information acquisition part 233, and the user processing part 33 are typically implemented with a processor, memory, etc. The processing procedure of the processing part 13, etc. is typically implemented with software, and the software is recorded on a recording medium such as ROM. However, the processing procedure may also be implemented with hardware (dedicated circuit). The processor may be a CPU, MPU, GPU, or the like, and the type is not particularly limited.

The transmission part 14, the image transmission part 141, the mobile transmission part 24, the movement information transmission part 241, the mobile image transmission part 242, and the user transmission part 34 are typically implemented with wireless or wired communication means, but may also be implemented with broadcasting means.

The shooting part 231 is implemented with a camera. The camera may be, for example, a CCD camera, CMOS camera, 3D camera, LiDAR, or omnidirectional camera, but the type is not particularly limited.

The user acceptance part 32 may be implemented with device drivers for input means such as touch panel and keyboard, or control software for menu screen.

The user output part 36 may be considered to include or not include output devices such as display and speaker. The user output part 36 may be implemented with driver software for output devices, or with driver software for output devices and the output devices.

Operation

Next, an operation example of the information system A will be described. First, an operation example of the information processing device 1 will be described using the flowchart of FIG. 4. "S" shown in each flowchart used in the following description indicates a step.

(S401) The movement information reception part 121 determines whether movement information associated with a right holder identifier is received from the mobile terminal 2. In a case where movement information is received, the processing proceeds to S402; in a case where movement information is not received, the processing proceeds to S403.

(S402) The movement information accumulation part 131 accumulates the movement information received in S401 in the terminal management part 111 in association with the right holder identifier. The processing returns to S401. In a case where the movement information is a right holder identifier, the movement information reception part 121 accumulates the right holder identifier.

(S403) The movement information reception part 121 determines whether termination information associated with a right holder identifier is received from the mobile terminal 2. In a case where termination information is received, the processing proceeds to S404; in a case where termination information is not received, the processing proceeds to S405.

(S404) The processing part 13 deletes the movement information paired with the right holder identifier associated with the termination information from the terminal management part 111. The processing returns to S401. Here, it is sufficient that, upon receiving the termination information, the storage part 11 manages a state indicating that the mobile terminal 2 corresponding to the right holder identifier is in a state of being unable to transmit images.

(S405) The position reception part 122 determines whether position information of the target terminal 4 is received. In a case where position information is received, the processing proceeds to S406; in a case where position information is not received, the processing returns to S401.

(S406) The image acquisition part 132, etc. acquires one image to be transmitted. An example of such image acquisition processing will be described using the flowcharts of FIG. 5 and FIG. 11.

(S407) The processing part 13 acquires an attribute value set corresponding to the image acquired in S406. An example of such attribute value set acquisition processing will be described using the flowchart of FIG. 6. Additionally, the attribute value set acquisition processing here may also be processing to acquire an attribute value set associated with images that are the source of the one image.

(S408) The image transmission part 141 transmits the image acquired in S406 to the user terminal 3. The image transmission part 141 refers to the correspondence table in the storage part 11 and transmits the image to the user terminal 3 identified by the user identifier paired with the identifier of the target terminal 4 that is paired with the position information.

(S409) The image acquisition part 132 determines whether new position information of the target terminal 4 has been received. In a case where new position information has been received, the processing proceeds to S410; in a case where new position information has not been received, the processing proceeds to S413. The new position information is position information transmitted from the moving mobile terminal 2, which is different from the position information used earlier to acquire the image.

Normally, during the movement of one or more targets, updated position information is continuously transmitted from the target terminal 4. In addition, the reception part 12 continuously receives position information associated with the target identifier and accumulates the position information paired with the target identifier in the storage part 11. Continuously receiving may include receiving periodically, receiving constantly, etc., regardless of the interval, frequency, etc. Also, the reception interval of the position information is not necessarily constant.

(S410) The image acquisition part 132 determines whether the position information acquired in S409 is within the shooting range of the image from the mobile terminal 2. An example of such determination processing will be described using the flowchart of FIG. 9.

(S411) In S410, in a case where the image acquisition part 132 determines that the position information is within the shooting range, the processing proceeds to S412; in a case where it is determined that the position information is not within the shooting range, the processing returns to S406. In a case where the position information acquired in S409 is within the shooting range of the image from the mobile terminal 2, the image from the mobile terminal 2 can continue to be used to acquire an image in which the target corresponding to the target terminal 4 is shown.

(S412) The reception part 12 continuously receives images from the mobile terminal 2. The processing returns to S403.

(S413) The image acquisition part 132 determines whether to terminate the acquisition of images capturing the target corresponding to the target terminal 4. In a case where it is determined to terminate, the processing proceeds to S414; in a case where it is determined not to terminate, the processing returns to S409. A case of terminating the acquisition of images is, for example, a case where the reception part 12 receives a termination instruction from the target terminal 4 or the user terminal 3. However, the trigger for terminating image acquisition is not particularly limited. In addition, the termination instruction is transmitted from the target terminal 4 to the information processing device 1, for example, in response to the power of the target terminal 4 being turned off.

(S414) The right holder processing part 134 performs preservation processing. The processing returns to S401. An example of the preservation processing will be described using the flowchart of FIG. 10.

Figure 4:
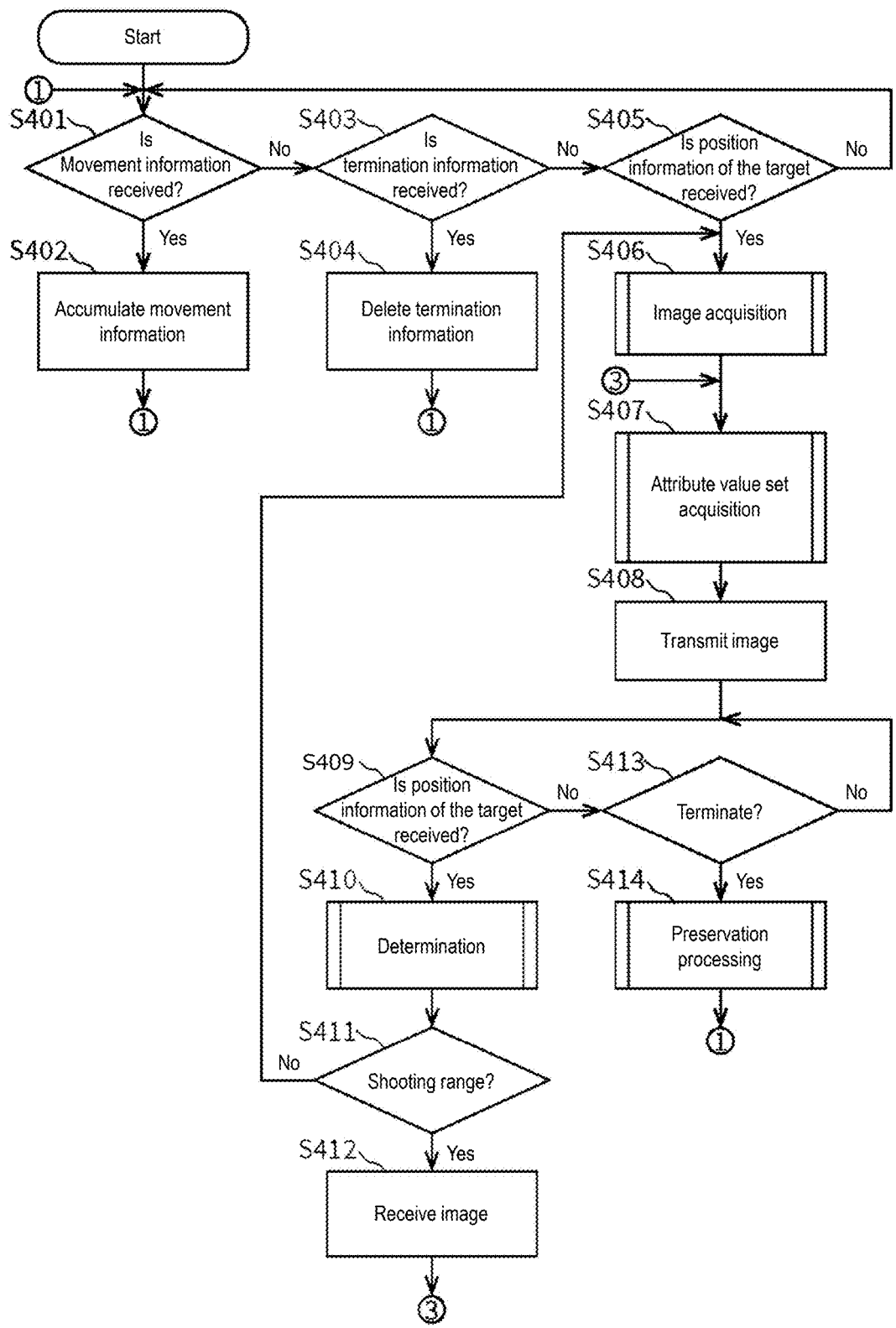
FIG. 4 is a flowchart illustrating an operation example of the information processing device 1.

In the flowchart of FIG. 4, the reception part 12 continuously receives the attribute value set including the position information of one or more mobile terminals 2. Then, the processing part 13 temporarily accumulates the attribute value set of the mobile terminal 2 in the storage part 11, paired with the terminal identifier of the mobile terminal 2. The attribute value set is, for example, information that specifies the shooting range of the mobile terminal 2. The attribute value set includes, for example, position information, angle of view, and direction information. However, the attribute value set may include only position information, for example. In a case where the attribute value set includes only position information, it is preferable that the shooting part 231 of the mobile terminal 2 is an omnidirectional camera.

Further, in the flowchart of FIG. 4, it is preferable to acquire continuously captured images of multiple moving targets and transmit the images to the user terminal 3. In other words, it is preferable that the processing from S405 to S414 is performed in parallel for each of the multiple targets.

Furthermore, in the flowchart of FIG. 4, the processing terminates due to interruptions such as power off and processing termination.

Next, the first example of the image acquisition processing of S406 will be described using the flowchart of FIG. 5.

(S501) The image acquisition part 132 assigns 1 to counter i.

(S502) The image acquisition part 132 determines whether an i-th mobile terminal 2 that is capturing images exists. In a case where the i-th mobile terminal 2 exists, the processing proceeds to S503; in a case where the i-th mobile terminal 2 does not exist, the processing proceeds to S505.

The determination of whether the i-th mobile terminal 2 that is capturing images exists is, for example, to determine whether an i-th terminal identifier paired with movement information indicating "that movement has started" exists.

(S503) The image acquisition part 132 acquires position information paired with the terminal identifier of the i-th mobile terminal 2. Further, the image acquisition part 132 acquires the position information of the target terminal 4. Next, the image acquisition part 132 calculates the distance between the position information of the mobile terminal 2 and the position information of the target terminal 4, and temporarily accumulates the distance in association with the terminal identifier in a buffer (not shown).

(S504) The image acquisition part 132 increments counter i by 1. The processing returns to S502.

(S505) The image acquisition part 132 sorts the attribute value sets paired with the terminal identifier with the distance calculated in S503 as a key, and temporarily accumulates the sorted result in a buffer (not shown). The attribute value set here includes the position information, angle of view, and direction information of the mobile terminal 2.

(S506) The image acquisition part 132 assigns 1 to counter j.

(S507) The image acquisition part 132 determines whether a j-th mobile terminal 2 exists. In a case where the j-th mobile terminal 2 exists, the processing proceeds to S508; in a case where the j-th mobile terminal 2 does not exist, the processing returns to S401 in FIG. 4.

The j-th mobile terminal 2 is the terminal corresponding to the j-th attribute value set sorted in S505. In other words, here, the image acquisition part 132 determines whether the j-th attribute value set exists among the attribute value sets sorted in S505.

Also, it is preferable that the image acquisition part 132 determines whether the j-th mobile terminal 2 exists among terminals that correspond to the j-th attribute value set sorted in S505 and are within a threshold distance from the position of the target.

(S508) The image acquisition part 132 acquires the j-th attribute value set from a buffer (not shown).

(S509) The image acquisition part 132 acquires shooting range information from the j-th attribute value set. Next, the image acquisition part 132 determines whether the range indicated by the j-th shooting range information includes the position indicated by the position information of the target terminal 4. In a case where the range includes the position of the target terminal 4, the processing proceeds to S511; in a case where the range does not include the position of the target terminal 4, the processing proceeds to S510.

(S510) The image acquisition part 132 increments counter j by 1. The processing returns to S507.

(S511) The image acquisition part 132 constructs a transmission request to be transmitted to the j-th mobile terminal 2. Next, the image acquisition part 132 transmits the transmission request to the j-th mobile terminal 2.

(S512) The image acquisition part 132 determines whether an image is received from the j-th mobile terminal 2. In a case where an image is received, the processing proceeds to S513; in a case where no image is received, the processing returns to S512.

(S513) The image acquisition part 132 acquires the image received from the j-th mobile terminal 2. The processing returns to the higher-level processing.

Figure 5:
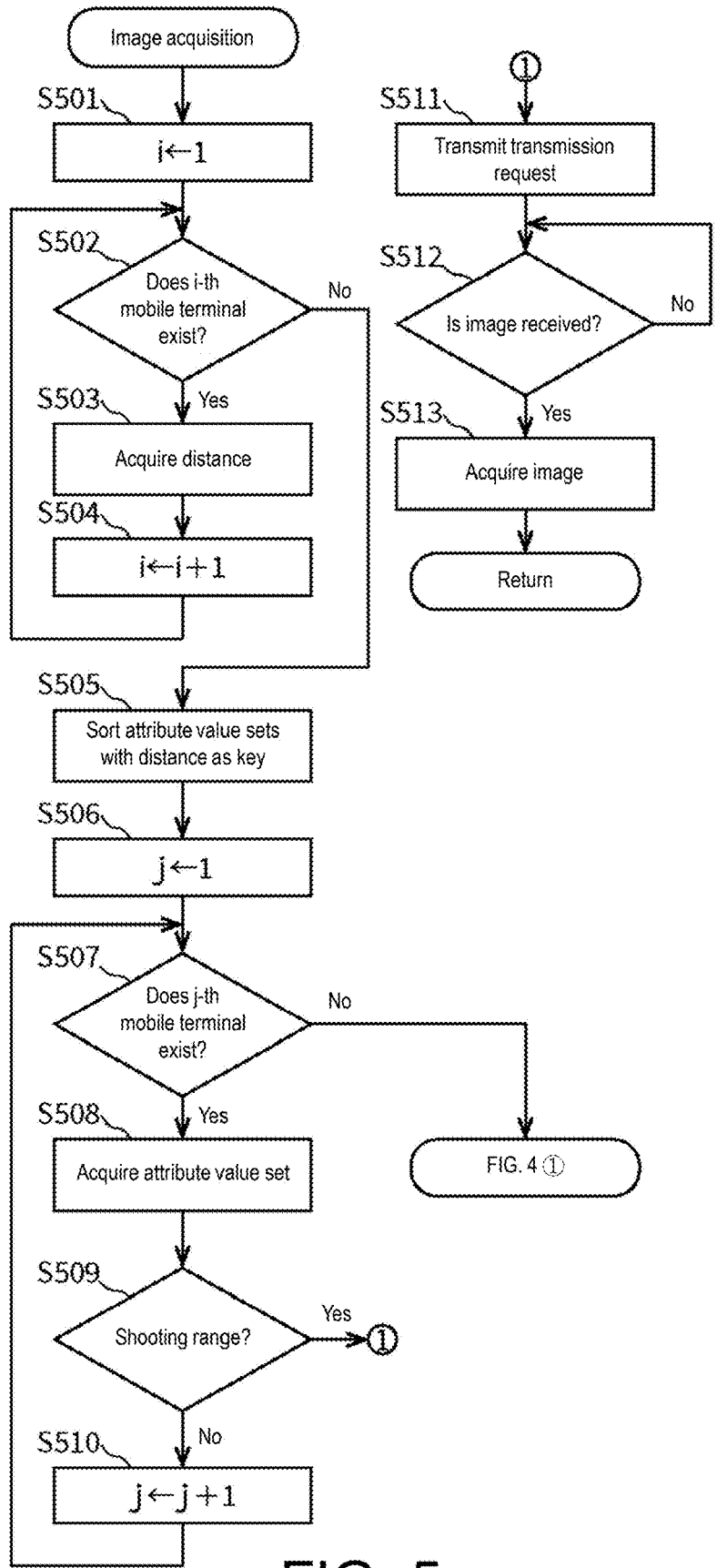
FIG. 5 is a flowchart illustrating the first example of the image acquisition processing.

In the flowchart of FIG. 5, the image acquisition part 132 may perform the determination in S509 for multiple mobile terminals 2, determine that multiple mobile terminals 2 are within the shooting range, transmit the transmission request to the multiple mobile terminals 2, and acquire images from the multiple mobile terminals 2. Using such multiple images, the image construction part 133 may spatially combine the images to construct a single image. Additionally, the image acquisition part 132 may select a single image from the received multiple images using the attribute value set paired with each image.

Next, an example of the attribute value set acquisition processing of S407 will be described using the flowchart of FIG. 6.

(S601) The processing part 13 acquires one or more pieces of environmental information, etc. associated with the image acquired by the image acquisition part 132. The environmental information, etc. may be only environmental information, or may be environmental information and one or more moving object attribute values.

(S602) The processing part 13 acquires the right holder identifier associated with the image transmitted from the mobile terminal 2.

(S603) The processing part 13 determines whether to perform annotation processing on the image. In a case of performing annotation processing, the processing proceeds to S604; in a case of not performing annotation processing, the processing proceeds to S611. It is assumed that whether to perform annotation processing is predetermined. In addition, it is preferable that either the information processing device 1 or the terminal performs annotation on the image.

(S604) The processing part 13 assigns 1 to counter i.

(S605) The processing part 13 determines whether the i-th annotation unit exists in the image. In a case where the i-th annotation unit exists, the processing proceeds to S606; in a case where the i-th annotation unit does not exist, the processing proceeds to S611. The annotation unit refers to the target for which annotation is acquired, for example, one frame, a certain number of frame groups, or images of a certain time period (for example, 5 seconds, 10 seconds).

(S606) The processing part 13 determines whether to use moving object attribute values during annotation. In a case of using moving object attribute values, the processing proceeds to S607; in a case of not using moving object attribute values, the processing proceeds to S608. It is assumed that whether to use moving object attribute values during annotation is predetermined. In addition, moving object attribute values are typically information transmitted in pair with images.

(S607) The processing part 13 performs moving object attribute value tag acquisition processing. An example of the moving object attribute value tag acquisition processing will be described using the flowchart of FIG. 7.

(S608) The processing part 13 determines whether to use the image during annotation. In a case of using the image, the processing proceeds to S609; in a case of not using the image, the processing proceeds to S610. It is assumed that whether to use the image during annotation is predetermined.

(S609) The processing part 13 performs image tag acquisition processing. An example of the image tag acquisition processing will be described using the flowchart of FIG. 8.

(S610) The processing part 13 increments counter i by 1. The processing returns to S605.

(S611) The processing part 13 constructs an attribute value set having one or more pieces of environmental information, one or more tags, and a right holder identifier. The processing returns to the higher-level processing.

Figure 6:
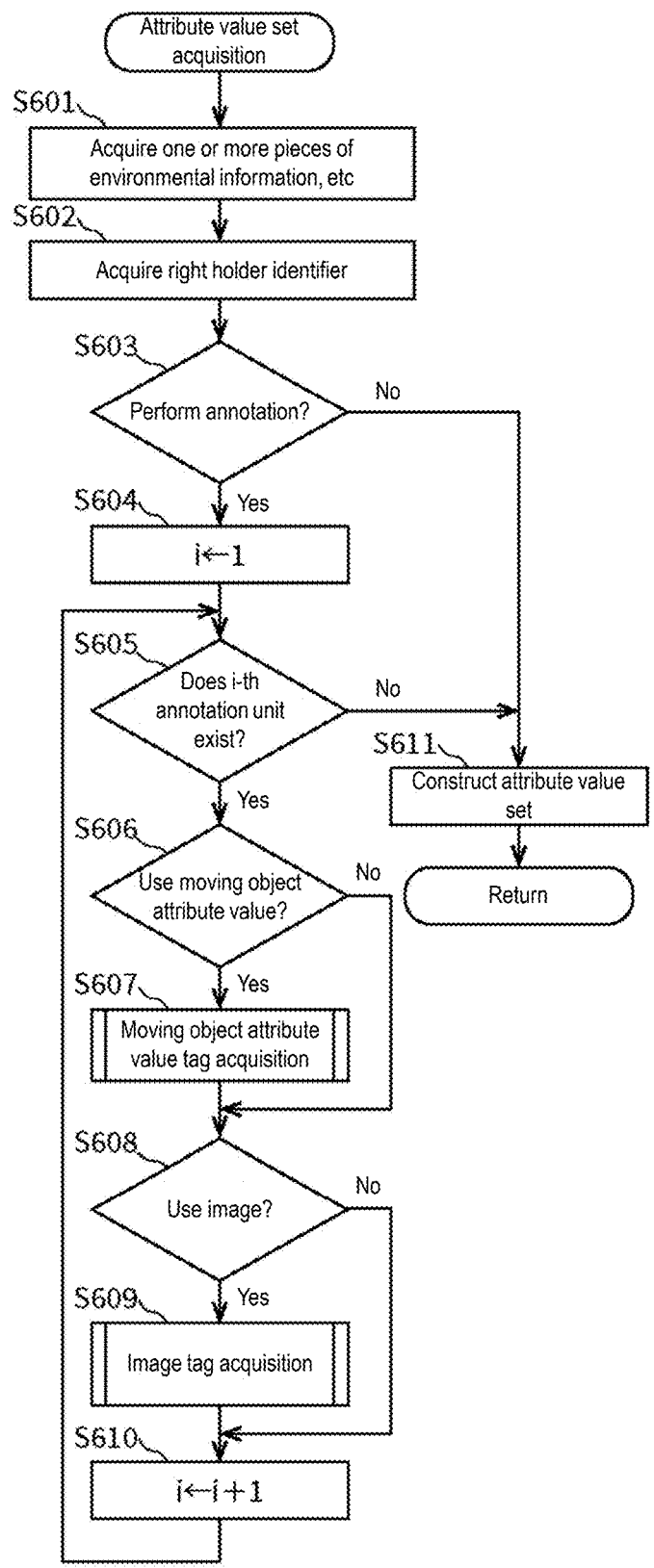
FIG. 6 is a flowchart illustrating an example of the attribute value set acquisition processing.

In the flowchart of FIG. 6, the image may be divided into multiple inspection units, and the processing from S601 to S611 may be performed for each inspection unit.

Figure 7:
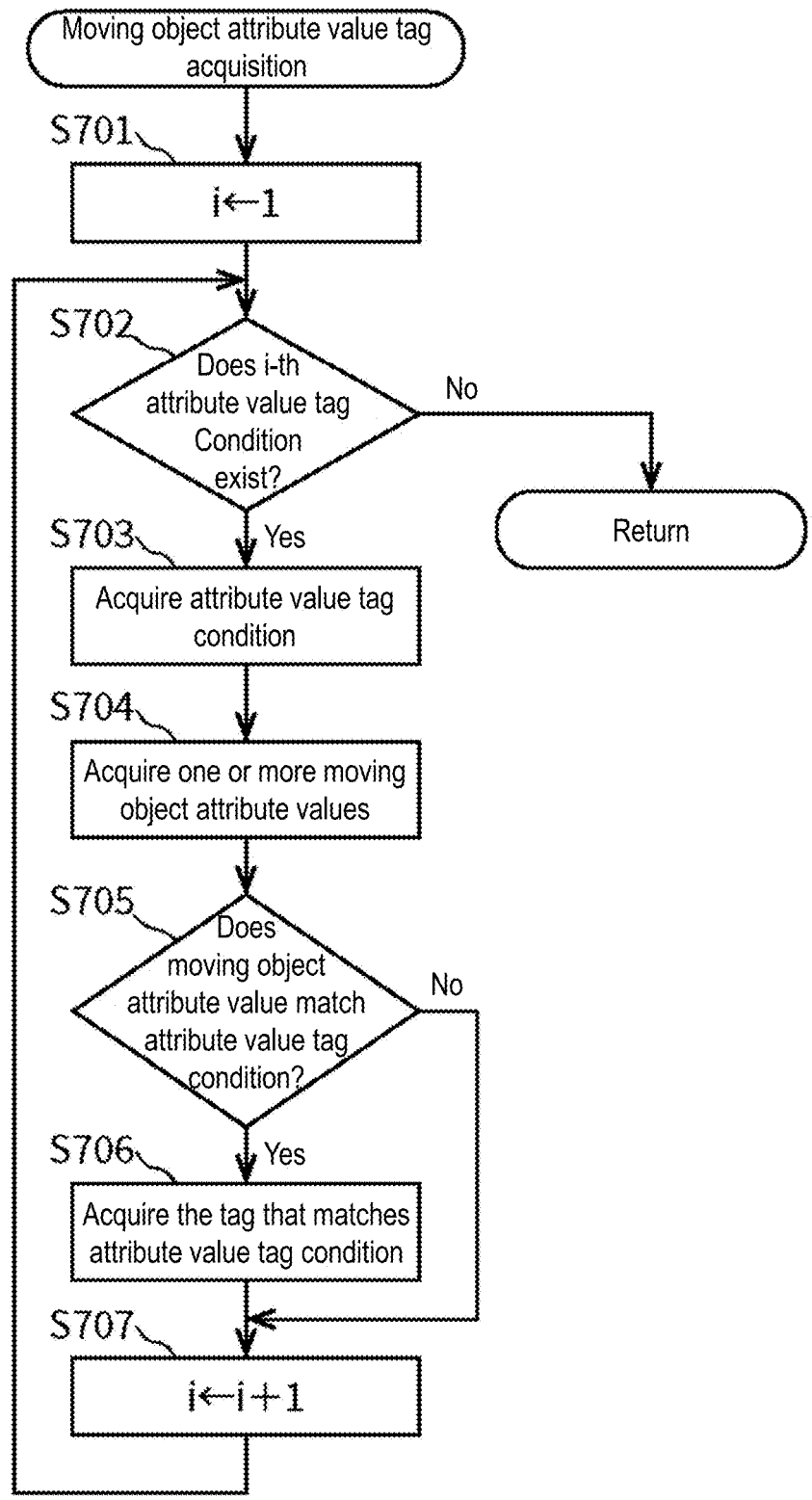
FIG. 7 is a flowchart illustrating an example of the moving object attribute value tag acquisition processing.

Next, an example of the moving object attribute value tag acquisition processing of S607 will be described using the flowchart of FIG. 7.

(S701) The processing part 13 assigns 1 to counter i.

(S702) The processing part 13 determines whether an i-th attribute value tag condition exists. In a case where the i-th attribute value tag condition exists, the processing proceeds to S703; in a case where the i-th attribute value tag condition does not exist, the processing returns to the higher-level processing.

(S703) The processing part 13 acquires the i-th attribute value tag condition.

(S704) The processing part 13 acquires one or multiple moving object attribute values used for determining the i-th attribute value tag condition.

(S705) The processing part 13 determines whether one or more moving object attribute values acquired in S704 satisfy the i-th attribute value tag condition. In a case where the attribute value tag condition is satisfied, the processing proceeds to S706; in a case where the attribute value tag condition is not satisfied, the processing proceeds to S707.

(S706) The processing part 13 acquires a tag paired with the i-th attribute value tag condition and associates the tag with the corresponding image. Associating the tag with an image is typically associating the tag with a field that constitutes the image.

(S707) The processing part 13 increments counter i by 1. The processing returns to S702.

Figure 8:
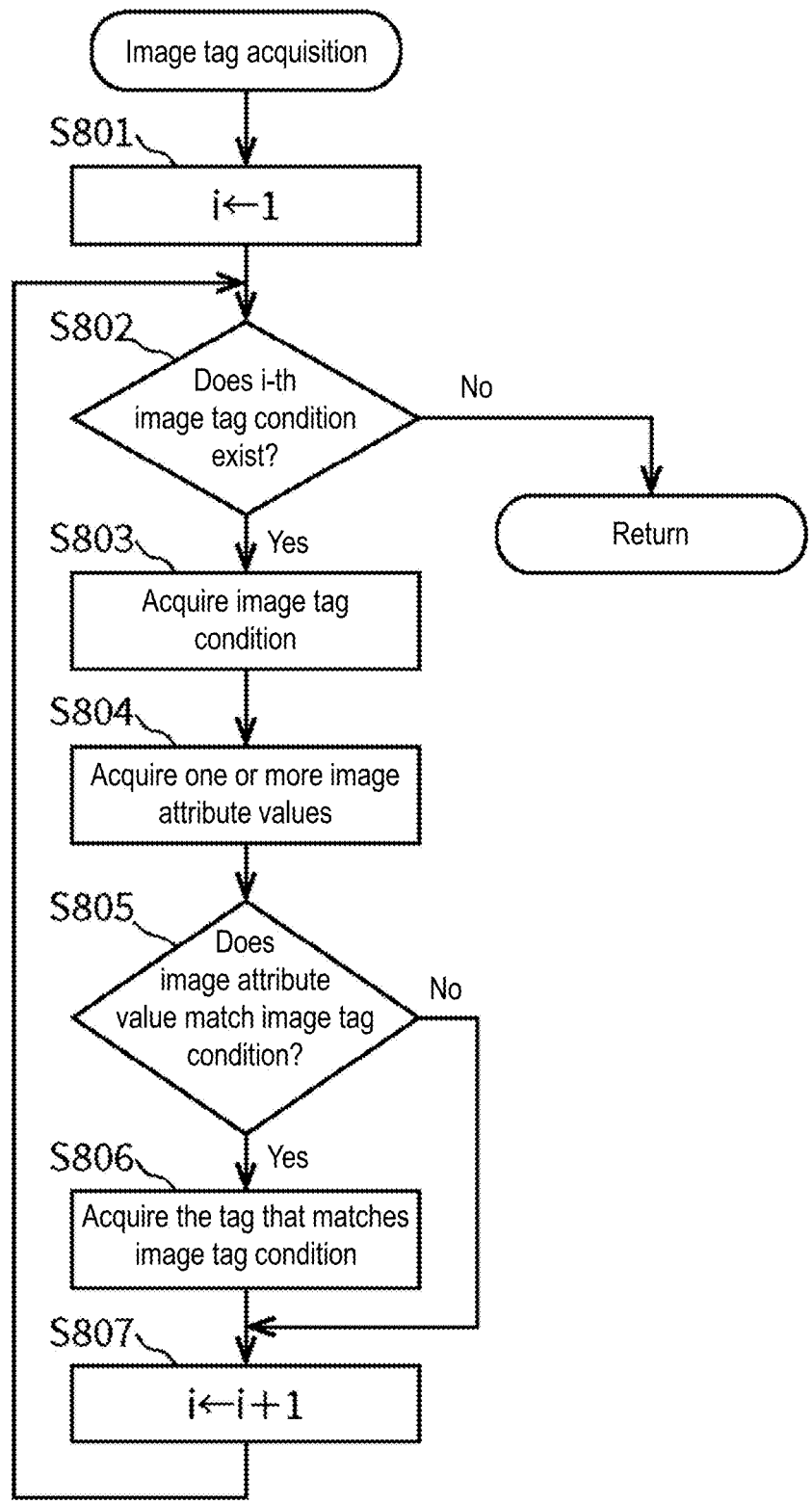
FIG. 8 is a flowchart illustrating an example of the image tag acquisition processing.

Next, an example of the image tag acquisition processing of S609 will be described using the flowchart of FIG. 8.

(S801) The processing part 13 assigns 1 to counter i.

(S802) The processing part 13 determines whether an i-th image tag condition exists. In a case where the i-th image tag condition exists, the processing proceeds to S803; in a case where the i-th image tag condition does not exist, the processing returns to the higher-level processing.

(S803) The processing part 13 acquires the i-th image tag condition.

(S804) The processing part 13 acquires one or more image attribute values to be used for determining the i-th image tag condition.

(S805) The processing part 13 determines whether one or more image attribute values acquired in S804 satisfy the i-th attribute value tag condition. In a case where the attribute value tag condition is satisfied, the processing proceeds to S806; in a case where the attribute value tag condition is not satisfied, the processing proceeds to S807.

(S806) The processing part 13 acquires a tag paired with the i-th attribute value tag condition, and associates the tag with the corresponding image. Associating the tag with an image is typically associating the tag with one or multiple frames paired with one or more image attribute values used for determining the attribute value tag condition.

(S807) The processing part 13 increments counter i by 1. The processing returns to S802.

Figure 9:
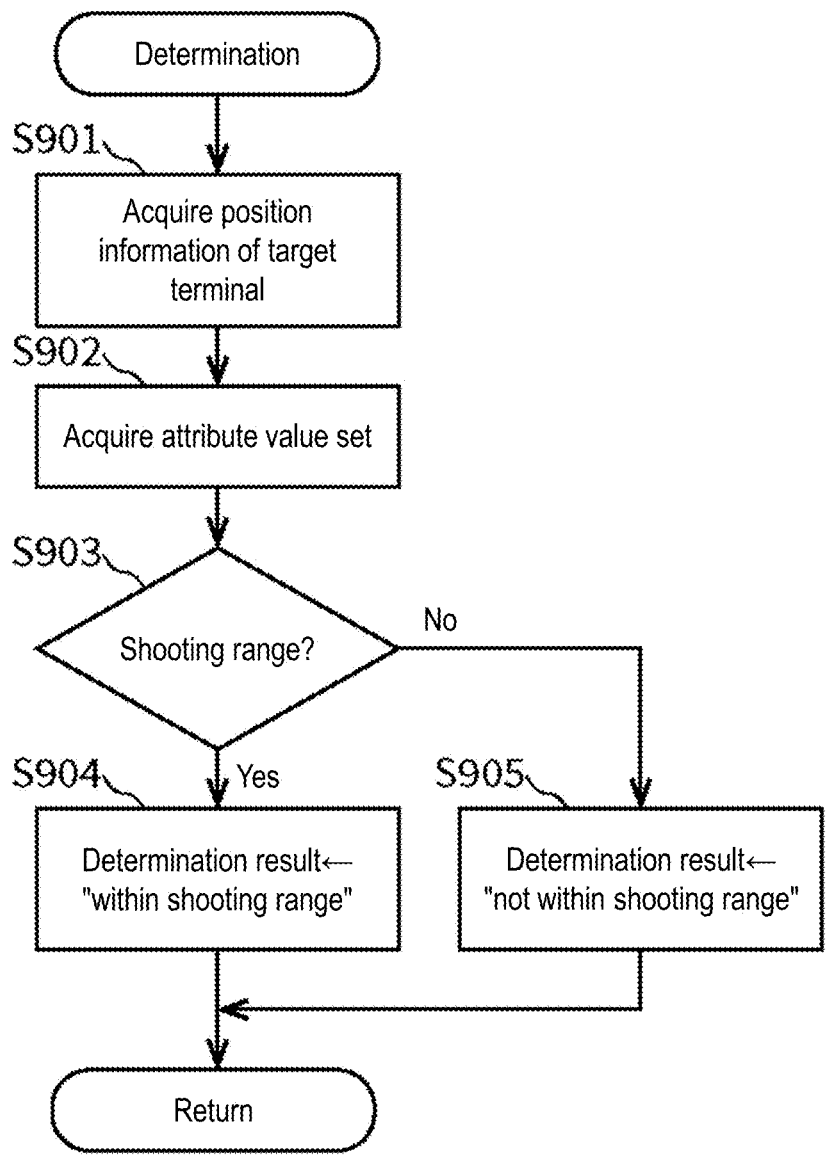
FIG. 9 is a flowchart illustrating an example of the determination processing.

Next, an example of the determination processing of S410 will be described using the flowchart of FIG. 9.

(S901) The image acquisition part 132 acquires the position information of the target terminal 4.

(S902) The image acquisition part 132 acquires the latest attribute value set of the mobile terminal 2 of interest. The attribute value set includes, for example, the position information, angle of view, and direction information of the mobile terminal 2.

(S903) The image acquisition part 132 acquires shooting range information from the latest attribute value set of the mobile terminal 2. The image acquisition part 132 determines whether the position indicated by the position information of the target terminal 4 is included in the range indicated by the shooting range information. In a case where the position is included in the range indicated by the shooting range information, the processing proceeds to S904; in a case where the position is not included, the processing proceeds to S905.

(S904) The image acquisition part 132 assigns "within shooting range" to the variable "determination result." The processing returns to the higher-level processing.

(S905) The image acquisition part 132 assigns "not within shooting range" to the variable "determination result." The processing returns to the higher-level processing.

Next, an example of the preservation processing of S414 will be described using the flowchart of FIG. 10.

(S1001) The right holder processing part 134 accumulates the transmitted image in association with the attribute value sets associated with one or multiple images that are the source of the transmitted image.

It is preferable that the right holder processing part 134 accumulates the image in pair with the right holder identifier that identifies one or multiple right holders of the image. The right holder identifier here is, for example, one or more right holder identifiers of the images that are the source of the accumulated image. The right holder identifier here is, for example, one right holder identifier that identifies the user who makes the inquiry.

In addition, the right holder processing part 134, for example, accumulates the image in the storage part 11 or in a device other than the information processing device 1. The device other than the information processing device 1 may be a device that constitutes a blockchain.

(S1002) The fourth preservation means 1344 performs fourth preservation processing. An example of the fourth preservation processing will be described using the flowchart of FIG. 11.

(S1003) The right holder processing part 134 assigns 1 to counter i.

(S1004) The right holder processing part 134 determines whether an i-th image that is the source of the accumulated image exists. In a case where the i-th image exists, the processing proceeds to S1005; in a case where the i-th image does not exist, the processing returns to the higher-level processing.

(S1005) The reward means 1345 performs reward processing. An example of the reward processing will be described using the flowchart of FIG. 12. The reward processing here is compensation processing for the right holder of the i-th image that is the source of the accumulated image.

(S1006) The right holder processing part 134 determines whether to change the right holder of the i-th image that is the source of the accumulated image. In a case where the right holder is changed, the processing proceeds to S1007; in a case where the right holder is not changed, the processing proceeds to S1008.

Whether to change the right holder may be based on a flag associated with the i-th image or may be predetermined, or the right holder may be changed in a case where "information indicating a right holder change request" is included in the inquiry.

(S1007) The right holder processing part 134 acquires the user identifier of the user terminal 3. Such a user identifier becomes the new right holder identifier.

(S1008) The right holder processing part 134 determines whether to accumulate the i-th image that is the source of the accumulated image. In a case where the i-th image is accumulated, the processing proceeds to S1009; in a case where the i-th image is not accumulated, the processing proceeds to S1011. Whether to accumulate the source image is, for example, predetermined. Also, whether to accumulate the source image is, for example, determined by the right holder processing part 134 based on the attribute value set. For example, the right holder processing part 134 determines to accumulate an image paired with an attribute value set including a specific tag (for example, "accident").

(S1009) The first preservation means 1341 accumulates the i-th image that is the source of the accumulated image.

(S1010) The fourth preservation means 1344 performs the fourth preservation processing related to the i-th image that is the source of the accumulated image. An example of the fourth preservation processing will be described using the flowchart of FIG. 11.

(S1011) The right holder processing part 134 increments counter i by 1. The processing returns to S1004.

Figure 10:
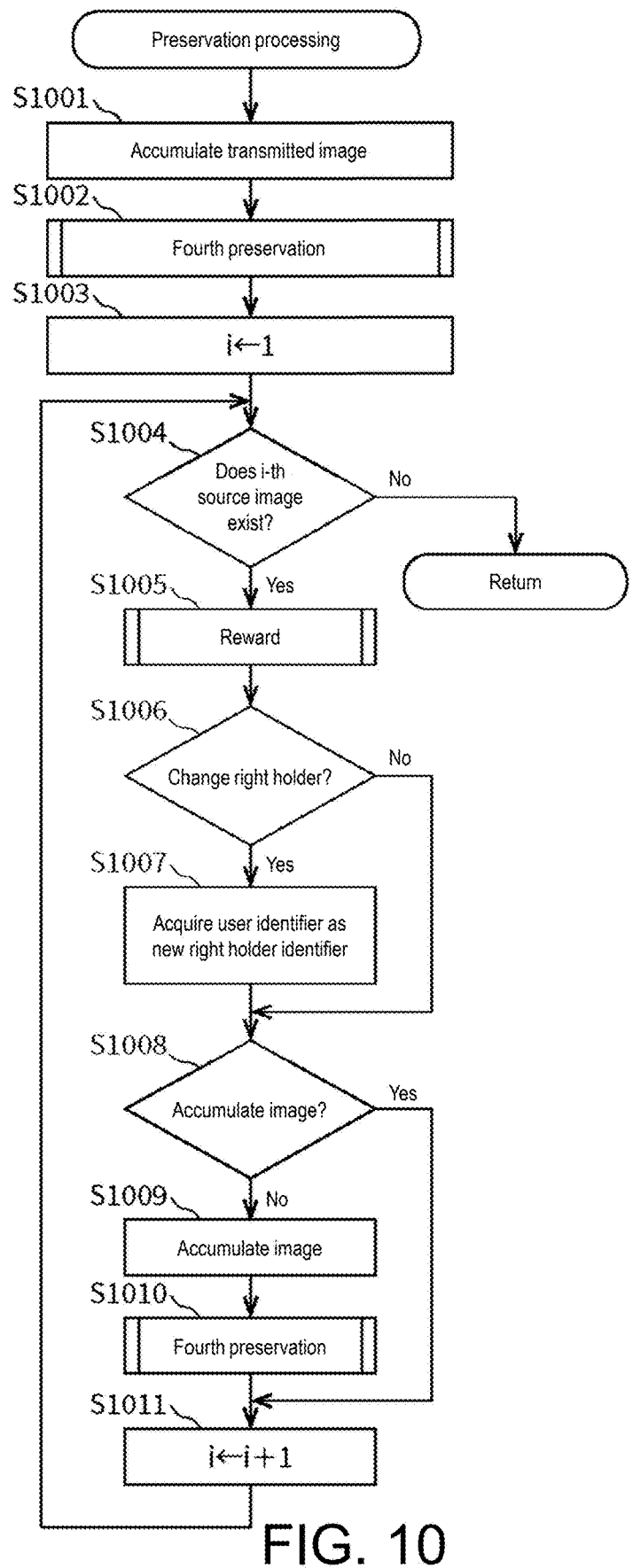
FIG. 10 is a flowchart illustrating an example of the preservation processing.

In the flowchart of FIG. 10, in a case where a combined image is constructed, the processing of accumulating multiple images that are the source of the combined image (S1009) and the fourth preservation processing (S1010) are performed, but such processing may be omitted.

Figure 11:
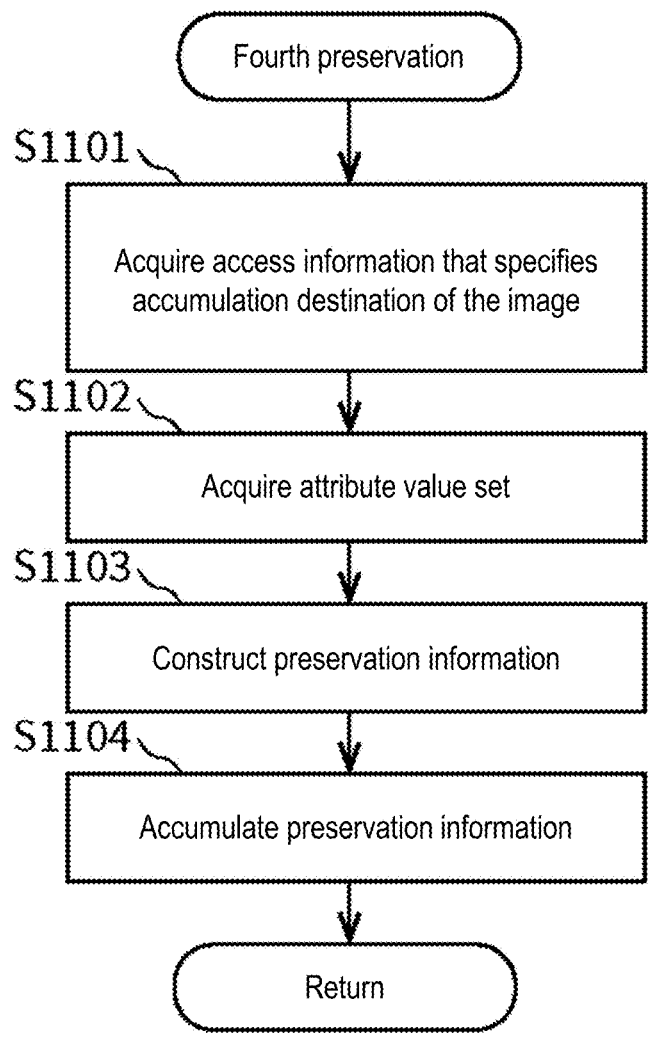
FIG. 11 is a flowchart illustrating an example of the fourth preservation processing.

Next, an example of the fourth preservation processing of S1010 will be described using the flowchart of FIG. 11.

(S1101) The fourth preservation means 1344 acquires access information that specifies the accumulation destination of the image.

(S1102) The fourth preservation means 1344 acquires the attribute value set corresponding to the accumulated image. In a case where the accumulated image is an image constructed from multiple source images, the attribute value set corresponding to the image is the attribute value set of each of the multiple source images.

(S1103) The fourth preservation means 1344 constructs preservation information having the access information acquired in S1101, the attribute value set acquired in S1102, and the right holder identifier of the image. In a case where a new right holder identifier has been acquired, the fourth preservation means 1344 constructs, for example, preservation information including the new right holder identifier and the original right holder identifier.

(S1104) The fourth preservation means 1344 accumulates the preservation information constructed in S1103. The processing returns to the higher-level processing. The fourth preservation means 1344, for example, accumulates the preservation information in a blockchain.

Next, an example of the reward processing of S1005, etc. will be described using the flowchart of FIG. 12.

(S1201) The reward means 1345 acquires one or multiple right holder identifiers of the target image. The reward means 1345 may acquire the right holder identifiers of the previous right holders of the target image.

(S1202) The reward means 1345 acquires the attribute value set of the target image.

(S1203) The reward means 1345 acquires a service identifier that identifies the service performed on the target image. The service identifier includes, for example, "use," "viewing," or "purchase." "Use" refers to being used in constructing one image.

(S1204) The reward means 1345 acquires a reward amount using one or multiple pieces of information among the attribute value set acquired in S1202 and the service identifier acquired in S1203.

In a case where multiple right holder identifiers are acquired, the reward means 1345 acquires a reward amount for each right holder identifier. In a case where history information of right holder including multiple right holder identifiers is acquired, the reward means 1345 may acquire a reward amount for each right holder identifier.

In addition, it is preferable that the reward means 1345, for example, acquires image attribute values corresponding to multiple images that are the source of the image transmitted by the image transmission part 141, and determines reward amounts for multiple right holders using the image attribute values. It is preferable that the reward means 1345, for example, determines a larger reward amount as the data amount, image time, or number of frames of the source image adopted in the image transmitted by the image transmission part 141 increases. It is preferable that the reward means 1345, for example, determines a larger reward amount as the resolution of the source image adopted in the image transmitted by the image transmission part 141 increases.

(S1205) The reward means 1345 performs processing to give a reward of a portion of the reward amount acquired in S1204 to the right holder identified by the right holder identifier acquired in S1201.

(S1206) The reward means 1345 performs processing to make the user who enjoys the service related to the target image bear the reward. The processing returns to the higher-level processing. The target image is typically the image transmitted to the user terminal 3.

Figure 12:
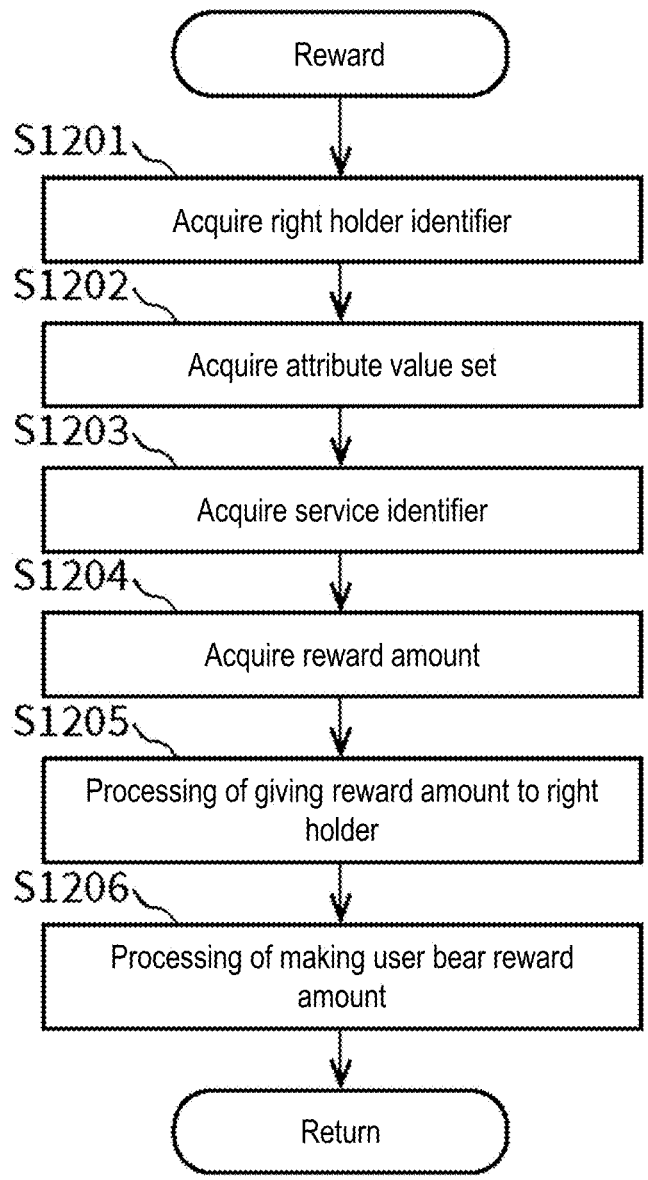
FIG. 12 is a flowchart illustrating an example of the reward processing.

In the flowchart of FIG. 12, the operator side of the information processing device 1 may acquire and accumulate profits.

Figure 13:
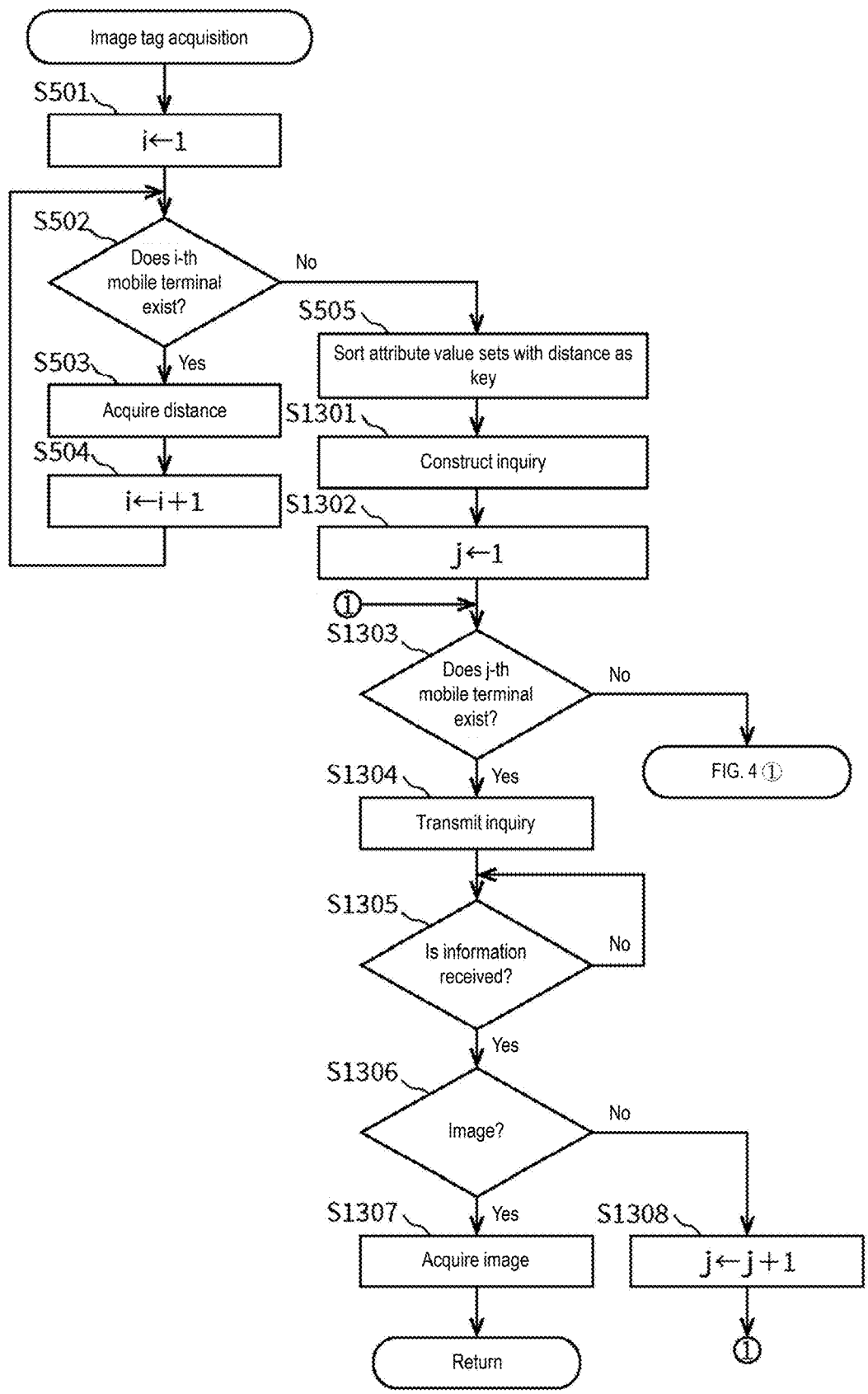
FIG. 13 is a flowchart illustrating the second example of the next image acquisition processing.

Next, the second example of the image acquisition processing of S406 will be described using the flowchart of FIG. 13. In the flowchart of FIG. 13, descriptions for steps identical to those in the flowchart of FIG. 5 are omitted.

(S1301) The image acquisition part 132 acquires the latest position information of the received target. The image acquisition part 132 constructs an inquiry including the position information.

(S1302) The image acquisition part 132 assigns 1 to counter j.

(S1303) The image acquisition part 132 determines whether a j-th mobile terminal 2 corresponding to movement information indicating that movement has started exists. In a case where the j-th mobile terminal 2 exists, the processing proceeds to S1304; in a case where the j-th mobile terminal 2 does not exist, the processing returns to S401.

(S1304) The image acquisition part 132 transmits the inquiry to the j-th mobile terminal 2.

(S1305) The image acquisition part 132 determines whether information is received from the j-th mobile terminal 2. In a case where information is received, the processing proceeds to S1306; in a case where no information is received, the processing returns to S1305.

(S1306) The image acquisition part 132 determines whether an image is included in the information received in S1305. In a case where an image is included, the processing proceeds to S1307; in a case where no image is included, the processing proceeds to S1308. A case where no image is included is, for example, a case where information (such as an error message) indicating that the position indicated by the position information of the target terminal 4 has not been captured is received.

(S1307) The image acquisition part 132 acquires the image received in S1305. The processing returns to the higher-level processing.

(S1308) The image acquisition part 132 increments counter j by 1. The processing returns to S1303.

In the flowchart of FIG. 13, images may be received from multiple mobile terminals 2. In such a case, it is preferable that the image acquisition part 132 selects one image using one or more image attribute values included in the attribute value sets of the mobile terminals 2. Also, in such a case, the image construction part 133 may construct one image by spatially fusing parts of the multiple images acquired by the image acquisition part 132.

Next, an operation example of the mobile terminal 2 will be described using the flowchart of FIG. 14.

(S1401) The mobile processing part 23 determines whether movement start is detected. In a case where movement start is detected, the processing proceeds to S1402; in a case where movement start is not detected, the processing proceeds to S1417. The movement start is caused by, for example, the engine ON of the moving object on which the mobile terminal 2 is installed, or the power ON of the mobile terminal 2.

(S1402) The movement information acquisition part 233 acquires movement information. The movement information acquisition part 233 acquires the terminal identifier in the mobile storage part 21. The movement information transmission part 241 transmits the movement information paired with the terminal identifier to the information processing device 1. The movement information is, for example, stored in the mobile storage part 21.

(S1403) The shooting part 231 starts shooting.

(S1404) The shooting part 231 acquires an image and accumulates the image in the mobile storage part 21.

(S1405) The mobile processing part 23 acquires an attribute value set of the mobile terminal 2. An example of such terminal attribute value set acquisition processing will be described using the flowchart of FIG. 15.

(S1406) The mobile processing part 23 determines whether movement termination is detected. In a case where movement termination is detected, the processing proceeds to S1407; in a case where movement termination is not detected, the processing returns to S1404.

(S1407) The movement information acquisition part 233 acquires termination information. The movement information acquisition part 233 acquires the terminal identifier in the mobile storage part 21. The movement information acquisition part 233 transmits the termination information to the information processing device 1 in association with the terminal identifier.

(S1408) The mobile reception part 22 determines whether an inquiry is received from the information processing device 1. In a case where an inquiry is received, the processing proceeds to S1409; in a case where no inquiry is received, the processing proceeds to S1414.

(S1409) The mobile processing part 23 performs terminal image acquisition processing corresponding to the inquiry received in S1408. An example of the terminal image acquisition processing will be described using the flowchart of FIG. 16. The terminal image acquisition processing refers to processing to acquire an image that matches the inquiry.

(S1410) The mobile processing part 23 determines whether an image is acquired in S1409. In a case where an image is acquired, the processing proceeds to S1411; in a case where no image is acquired, the processing proceeds to S1413.

(S1411) The mobile processing part 23 acquires an attribute value set of the mobile terminal 2. An example of such terminal attribute value set acquisition processing will be described using the flowchart of FIG. 15.

(S1412) The mobile image transmission part 242 transmits the image, etc. to the information processing device 1. The processing returns to S1401. The image, etc. refers to, for example, the image, attribute value set, and right holder identifier.

(S1413) The mobile image transmission part 242 transmits error information associated with the right holder identifier. The error information is information indicating that the image cannot be acquired.

(S1414) The mobile reception part 22 determines whether a transmission request is received from the information processing device 1. In a case where a transmission request is received, the processing proceeds to S1415; in a case where no transmission request is received, the processing returns to S1401.

(S1415) The mobile processing part 23 acquires the image being captured by the shooting part 231. Such an image includes the latest frame, but it is preferable that the image also includes frames captured in the past and stored in the mobile storage part 21. In addition, the length of such an image is not particularly limited.

(S1416) The mobile processing part 23 acquires an attribute value set of the mobile terminal 2. An example of such terminal attribute value set acquisition processing will be described using the flowchart of FIG. 15.

(S1417) The mobile image transmission part 242 transmits the image, etc. acquired in S1415 to the information processing device 1. The processing returns to S1401. The image, etc. refers to, for example, the image, attribute value set, and right holder identifier.

(S1418) The mobile processing part 23 determines whether to terminate transmission of the image. In a case of terminating the image transmission, the processing returns to S1401; in a case of not terminating the image transmission, the processing returns to S1415.

Figure 14:
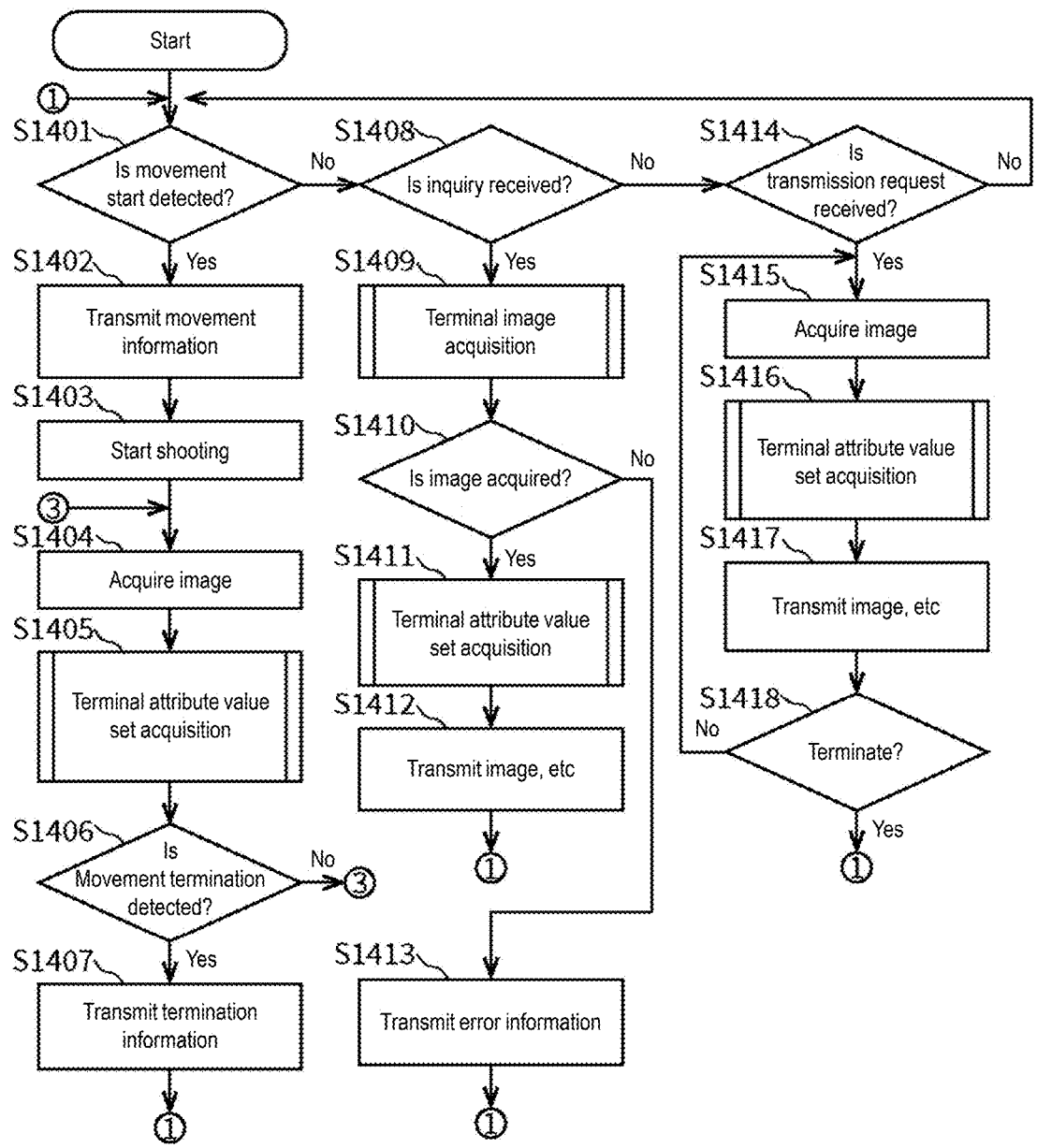
FIG. 14 is a flowchart illustrating an operation example of the mobile terminal 2.

In the flowchart of FIG. 14, it is preferable that the mobile processing part 23 of the mobile terminal 2 continuously acquires position information according to the passage of time, and the mobile transmission part 24 continuously transmits the acquired position information, paired with the right holder identifier, to the information processing device 1.

Additionally, in the flowchart of FIG. 14, the mobile terminal 2 may constantly transmit the image, etc. to the information processing device 1.

Furthermore, in the flowchart of FIG. 14, the processing terminates due to interruptions such as power off or processing termination.

Figure 15:
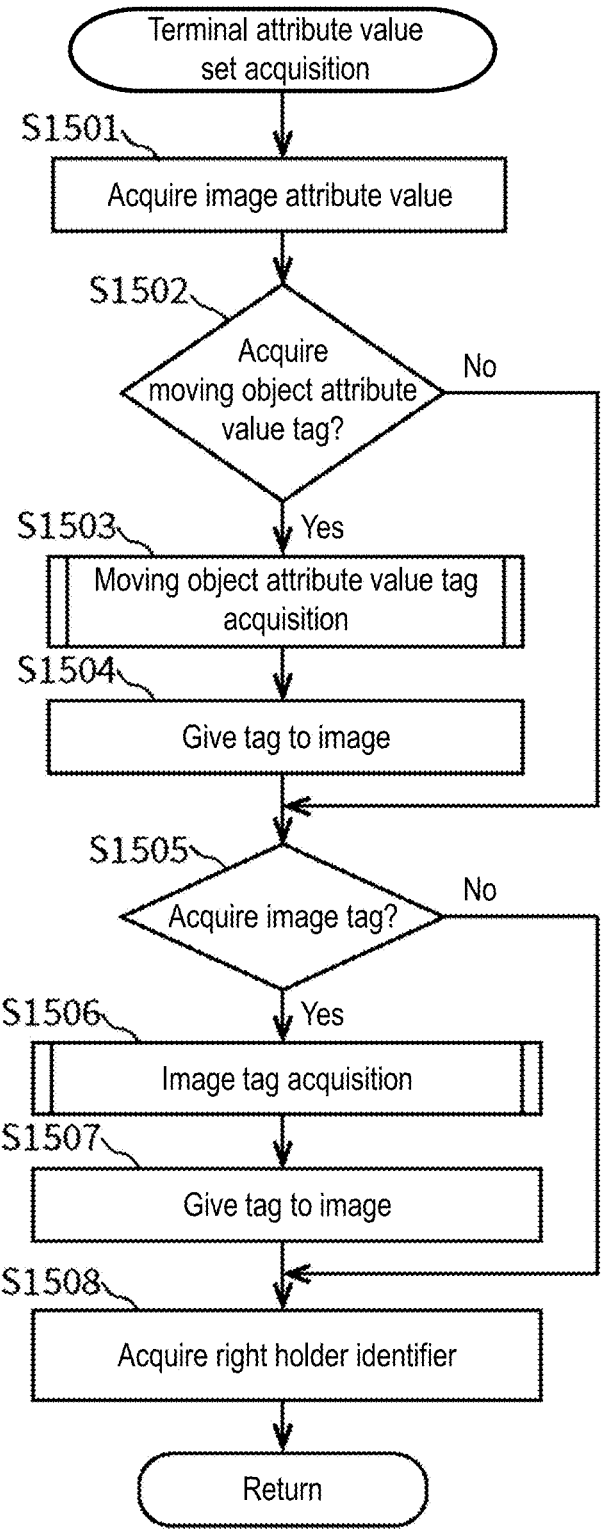
FIG. 15 is a flowchart illustrating an example of the terminal attribute value set acquisition processing.

Next, an example of the terminal attribute value set acquisition processing of S1405 and S1416 will be described using the flowchart of FIG. 15.

(S1501) The mobile processing part 23 acquires one or multiple image attribute values, and associates the one or more image attribute values with the acquired image.

The mobile processing part 23 acquires, for example, position information, time information, weather information, temperature information, and seasonal information. In addition, the mobile processing part 23 acquires, for example, one or multiple moving object attribute values (for example, CAN data).

(S1502) The tag acquisition part 232 determines whether to acquire a moving object attribute value tag. In a case of acquiring a moving object attribute value tag, the processing proceeds to S1503; in a case of not acquiring a moving object attribute value tag, the processing proceeds to S1505. Whether to acquire a moving object attribute value tag is predetermined.

(S1503) The tag acquisition part 232 performs moving object attribute value tag acquisition processing. An example of the moving object attribute value tag acquisition processing is the same processing as shown in the flowchart of FIG. 7. Here, there may be a case where a tag cannot be acquired.

(S1504) In a case where one or more tags are acquired in S1503, the tag acquisition part 232 associates the one or more tags with the acquired image.

Here, it is preferable that the tag acquisition part 232 associates one or more tags with the image and accumulates the one or more tags in the mobile storage part 21. This allows the user of the mobile terminal 2 to search for images using tags as keys, for example.

(S1505) The tag acquisition part 232 determines whether to acquire an image tag. In a case of acquiring an image tag, the processing proceeds to S1506; in a case of not acquiring an image tag, the processing proceeds to S1508. Whether to acquire an image tag is predetermined.

(S1506) The tag acquisition part 232 performs image tag acquisition processing. An example of the image tag acquisition processing is the same processing as shown in the flowchart of FIG. 8. Here, there may be a case where a tag cannot be acquired.

(S1507) In a case where one or more tags are acquired in S1506, the tag acquisition part 232 associates the one or more tags with the acquired image.

Here, it is preferable that the tag acquisition part 232 associates one or more tags with the image and accumulates the one or more tags in the mobile storage part 21. This allows the user of the mobile terminal 2 to search for images using tags as keys, for example.

(S1508) The mobile processing part 23 acquires a right holder identifier from the mobile storage part 21 and associates the right holder identifier with the image. The processing returns to the higher-level processing.

Figure 16:
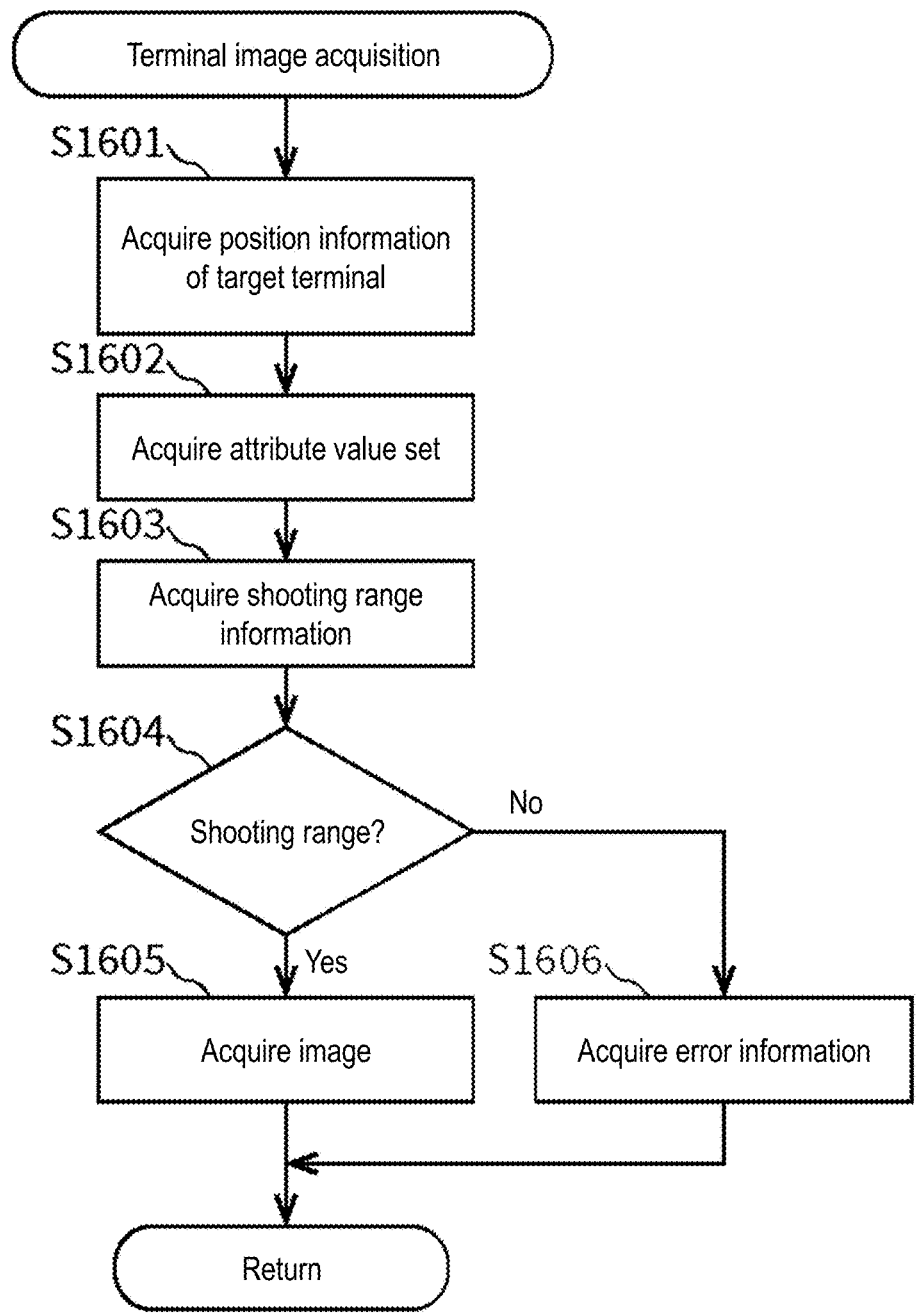
FIG. 16 is a flowchart illustrating an example of the terminal image acquisition processing.

An example of the terminal image acquisition processing of S1409 will be described using the flowchart of FIG. 16.

(S1501) The mobile processing part 23 acquires the position information of the target terminal 4.

(S1502) The mobile processing part 23 acquires an attribute value set of the mobile terminal 2. The attribute value set includes, for example, the position information, angle of view, and direction information of the mobile terminal 2.

(S1503) The mobile processing part 23 acquires shooting range information using the attribute value set acquired in S1502.

(S1504) The mobile processing part 23 determines whether the position indicated by the position information of the target terminal 4 is included in the shooting range indicated by the shooting range information. In a case where the position is included in the shooting range, the processing proceeds to S1505; in a case where the position is not included, the processing proceeds to S1506.

(S1505) The mobile processing part 23 acquires the image captured by the shooting part 231. The processing returns to the higher-level processing.

(S1506) The mobile processing part 23 acquires error information. The processing returns to the higher-level processing. The error information includes information indicating that no image is acquired, and information indicating that the position of the target terminal 4 is not included in the shooting range.

Specific Operation Example

The following describes a specific operation example of the information system A in this embodiment.

Now, a terminal management table having the structure shown in FIG. 17 is stored in the terminal management part 111 of the information processing device 1. The terminal management table refers to a table that manages terminal information of one or multiple mobile terminals 2. The terminal management table is a table that manages mobile terminals 2 that transmit videos. Fixed terminals not managed in the terminal management table may also transmit images to the information processing device 1.

The terminal management table manages one or more records including "ID," "terminal identifier," "image attribute value," and "movement information." The "image attribute value" includes "environmental information." The "environmental information" includes "position information," "direction information," "camera information," "time information," "weather information," and "temperature information." The "camera information" includes "angle of view" and "resolution." The "environmental information" is information about the environment surrounding the mobile terminal 2 when an image is acquired.

The "ID" is information that identifies a record. The "terminal identifier" is an identifier of the mobile terminal 2, which is the same as the right holder identifier that identifies the right holder of the image at the time of image transmission. The "position information" here is (latitude, longitude). The "direction information" is the shooting direction of the camera, which here is the angle clockwise from true north. In other words, in a case where the shooting direction of the camera is due east, the direction information is "90 degrees." The "angle of view" is the angle of view of the camera. The "resolution" is the resolution of the camera. The "time information" here is year/month/day/hour/minute/second. "Movement information=1" indicates that the mobile terminal 2 is currently in a state of being capable of transmitting images. "Movement information=0" indicates that the mobile terminal 2 is currently in a state of being incapable of transmitting images due to power OFF, etc. "Movement information=0" may be considered as termination information.

The mobile terminal 2 transmits movement information "1" to the information processing device 1 in association with the terminal identifier at the start of movement. Then, the information processing device 1 receives the movement information "1" and accumulates such information in the terminal management table in association with the terminal identifier. Also, the mobile terminal 2 that is moving is continuously transmitting the attribute value set including position information and direction information, paired with the terminal identifier, to the information processing device 1. Then, the information processing device 1 receives the terminal identifier and the attribute value set including position information and direction information, acquires time information from a clock (not shown), and accumulates the image attribute value including position information, direction information, and time information in the terminal management table in association with the terminal identifier. Further, the camera information is stored in advance in the terminal management table in association with the terminal identifier. In addition, the mobile terminal 2 transmits termination information "0" associated with the terminal identifier to the information processing device 1 at the end of movement. Then, the information processing device 1 receives the termination information "0" and accumulates the termination information "0" as the attribute value of the attribute "movement information" in the terminal management table in association with the terminal identifier. The terminal management table shown in FIG. 17 is constructed by the above processing.

Furthermore, a registered image management table having the structure shown in FIG. 18 is stored on a blockchain. The registered image management table refers to a table that manages registered images. The registered image management table is a table that manages preservation information. The registered images include, for example, images provided to the user and images that satisfy a preservation condition. In other words, here, images transmitted to the user terminal 3 and images that satisfy the preservation condition are automatically accumulated.

The registered image management table manages one or more records including "ID," "image identifier," "access information," "right holder identifier," "right registration date," "image information," and "provision flag." The "image information" is information related to the captured image, and here includes "frame identifier" and "image attribute value." The "image attribute value" includes "environmental information" and "tag." The "environmental information" includes "position information," "direction information," "camera information," and "time information." The "camera information" includes "angle of view" and "resolution." The "environmental information" is information about the environment surrounding the mobile terminal 2 when an image is acquired. The "tag" here includes "accident," "traffic jam," and "dangerous driving." The "tag" is information associated with the image through the processing described above, for example.

The registered images are stored in the information processing device 1, other devices, or on a blockchain. In addition, each record in the registered image management table is considered preservation information here. "1" in the "provision flag" indicates that viewing of the image is permitted. "2" in the "provision flag" indicates that selling the image (transfer of right holder) is permitted.

Specific Example

In such a situation, the following specific example will be described. The specific example is a case where a combined image combined from moving images captured by mobile terminals 2 installed on multiple moving objects is transmitted to a user terminal 3 of a user (for example, a guardian) related to the target person (for example, a child, a wandering elderly person) in order to watch over the target person.

The storage part 11 of the information processing device 1 stores correspondence information that includes a user identifier (for example, an IP address of the user terminal 3) for transmitting images to the user terminal 3 of one guardian P, and a target identifier "T001" that identifies the target terminal 4 of one child A of guardian P.

Next, it is assumed that child A turned ON the power of the target terminal 4 to return home from school. Then, the target terminal 4 periodically acquires position information and transmits an inquiry (for example, "image transmission request target identifier=T001, position information $(x_{t1}, y_{t1})$") including the position information and the target identifier "T001" to the information processing device 1. The target terminal 4 stores the target identifier "T001" and communication destination information (for example, IP address) of the information processing device 1 for transmitting information to the information processing device 1.

In addition, the reception part 12 of the information processing device 1 periodically receives position information and direction information that specify the position of the mobile terminal 2, paired with the terminal identifier, from multiple mobile terminals 2, and accumulates such information in the terminal management table (FIG. 17) paired with the terminal identifier.

Next, the position reception part 122 of the information processing device 1 receives the inquiry "image transmission request target identifier=T001, position information $(x_{t1}, y_{t1})$" from the target terminal 4, and temporarily accumulates the position information $(x_{t1}, y_{t1})$ and the target identifier "T001" in a buffer (not shown). The position information of the target terminal 4 is received periodically, and the latest position information is accumulated in the buffer (not shown).

Next, the image acquisition part 132, through the operation described in the flowchart of FIG. 5, refers to the terminal management table (FIG. 17) and determines the mobile terminal 2 corresponding to the position information, angle of view, and direction information that satisfy the position condition for the position indicated by the latest position information of the target terminal 4, as follows.

In other words, the image acquisition part 132 examines the terminal management table (FIG. 17) to determine whether there exist the latest position information, direction information, and angle of view that satisfy the position condition (capturing the position indicated by the latest position information of the target terminal 4) for the latest position information of the target terminal 4. Here, the image acquisition part 132 determines that position information, etc. that satisfies the position condition exists in the terminal management table (FIG. 17). Then, the image acquisition part 132 determines the first terminal (here, the mobile terminal 2 mounted in an automobile). Next, the image acquisition part 132 transmits a transmission request to the first terminal.

Next, the mobile terminal 2, which is the first terminal that receives the transmission request, transmits the captured image to the information processing device 1 together with the first right holder identifier and the first attribute value set.

Next, the reception part 12 of the information processing device 1 receives the first right holder identifier, the first attribute value set, and the image. Child A appears in this image. Also, it is preferable that the received image is an image that is immediately transmitted after being captured by the mobile terminal 2.

Next, the image transmission part 141 transmits the image received by the image acquisition part 132 to the user terminal 3 of guardian P identified by the user identifier paired with the target identifier "T001."

Then, the image acquisition part 132 temporarily accumulates the image received from the first terminal in a buffer (not shown), paired with the first right holder identifier and position information of the first terminal.

While the position information of the target terminal 4 of child A and the position information of the first terminal satisfy the position condition, the image acquisition part 132 at least receives the image received from the first terminal, and the image transmission part 141 transmits the image to the user terminal 3 of guardian P. During this period, one or both of the position information of the target terminal 4 and the position information of the first terminal are updated.

Through the above image transmission, the user terminal 3 sequentially receives and outputs images acquired by multiple mobile terminals 2. This allows guardian P to see the state of child A returning home.

Then, as time passes, a third terminal, which is a mobile terminal 2 approaching child A, comes to exist, and the image acquisition part 132 determines the latest position information of the third terminal that satisfies the position condition for the latest position information of the target terminal 4, with reference to the terminal management table (FIG. 17).

Next, the image acquisition part 132 acquires an image, etc. from the third mobile terminal 2. Then, the image acquisition part 132 temporarily accumulates the image in a buffer (not shown) paired with the third right holder identifier and the attribute value set of the third mobile terminal 2.

Next, the image transmission part 141 transmits the image received by the image acquisition part 132 from the third mobile terminal 2 to the user terminal 3 of guardian P identified by the user identifier paired with the target identifier "T001."

Next, the user terminal 3 receives and outputs the image acquired by the third mobile terminal 2. Thus, although guardian P is unable to see the state of child A returning home for a short period of time, the output of this image allows guardian P to once again see the state of child A returning home.

The above processing is continued until the power of the target terminal 4 of child A is turned OFF (until child A returns home), allowing guardian P to monitor the state of child A returning home from school.

In addition, the reward means 1345 performs the reward processing described above for the right holders identified by the respective right holder identifiers of the first mobile terminal 2, the second mobile terminal 2, and the third mobile terminal 2 that have provided images to guardian P.

Furthermore, the image construction part 133 combines the images transmitted from multiple mobile terminals 2 in the order of transmission to construct a single image. The single image may also be referred to as a combined image.

In addition, the right holder processing part 134 accumulates the combined image in pair with the right holder identifier that is the identifier of guardian P.

Further, the right holder processing part 134 accumulates the combined image in association with the attribute value sets associated with one or multiple images that are the source of the combined image.

Next, the fourth preservation means 1344 acquires access information that specifies the accumulation destination of the combined image. Additionally, the fourth preservation means 1344 acquires the attribute value set corresponding to the accumulated combined image. Next, the fourth preservation means 1344 constructs preservation information including the acquired access information, the acquired attribute value set, and the right holder identifier of the image. Next, the fourth preservation means 1344 accumulates the constructed preservation information in a blockchain. An example of such preservation information is the record with "ID=2" in FIG. 18.

According to the specific example above, it is possible to watch over the target person holding the target terminal 4 using the combined image. Additionally, it is possible to provide a reward to the right holders who have provided the source images for the combined image for monitoring purposes. Furthermore, the combined image can be appropriately managed.

In addition to the above specific example, for example, when the target terminal is mounted in a moving vehicle, a combined image may be generated from images capturing the movement status of the vehicle, which are acquired from other mobile terminals 2, and provided to the user. Besides, for example, when an athlete participating in a race carries the user terminal 3 during the race, a combined image may be generated from images capturing the athlete, which are acquired from other mobile terminals 2. The race may be, for example, a marathon or a race using motorcycle, bicycle, automobile, motorboat, etc.

According to the embodiment above, it is possible to provide a useful single image using an image from a mobile terminal that captures a moving target.

Further, according to the embodiment, it is possible to provide a useful single image using images from multiple mobile terminals that capture a moving target.

The processing in the embodiment may be implemented by software. The software may be distributed through software download or the like. Additionally, the software may be recorded on a recording medium such as CD-ROM to be distributed.

Figure 19:
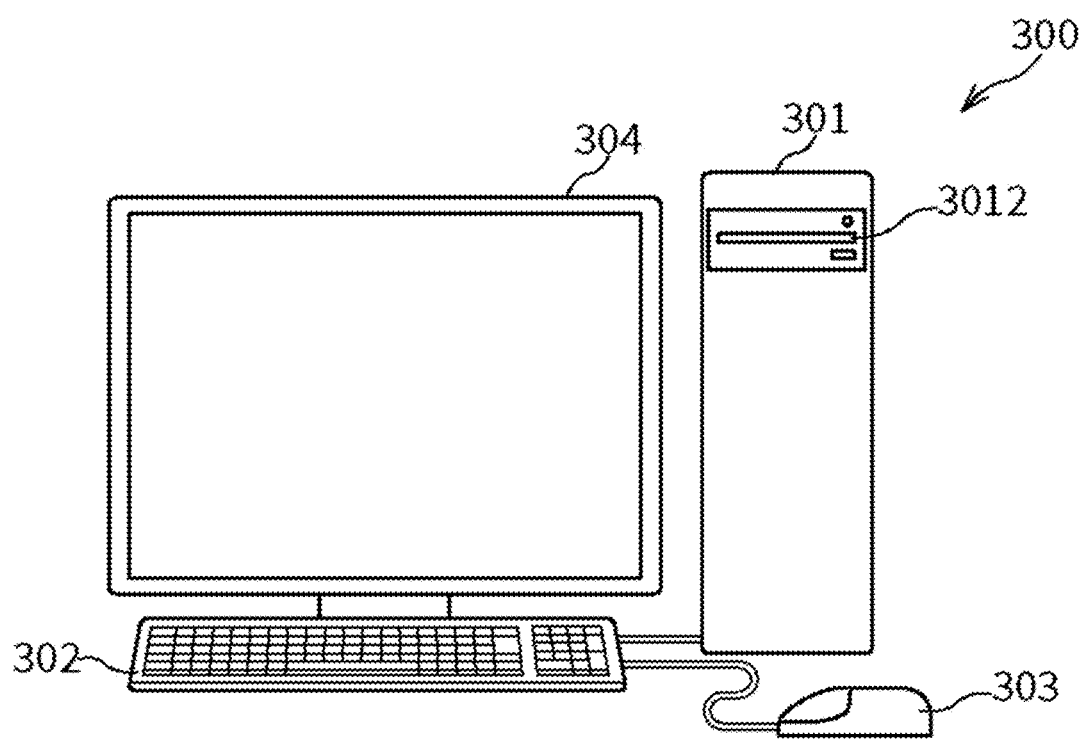
FIG. 19 is an overview diagram of a computer system.

Further, FIG. 19 shows the external appearance of a computer that executes the program described in this specification to implement the information processing device 1, etc. in the various embodiments described above. The above-described embodiments may be implemented by computer hardware and computer programs executed thereon. FIG. 19 is an overview diagram of this computer system 300, and FIG. 20 is a block diagram of the system 300.

In FIG. 19, the computer system 300 includes a computer 301 with a CD-ROM drive, a keyboard 302, a mouse 303, and a monitor 304.

Figure 20:
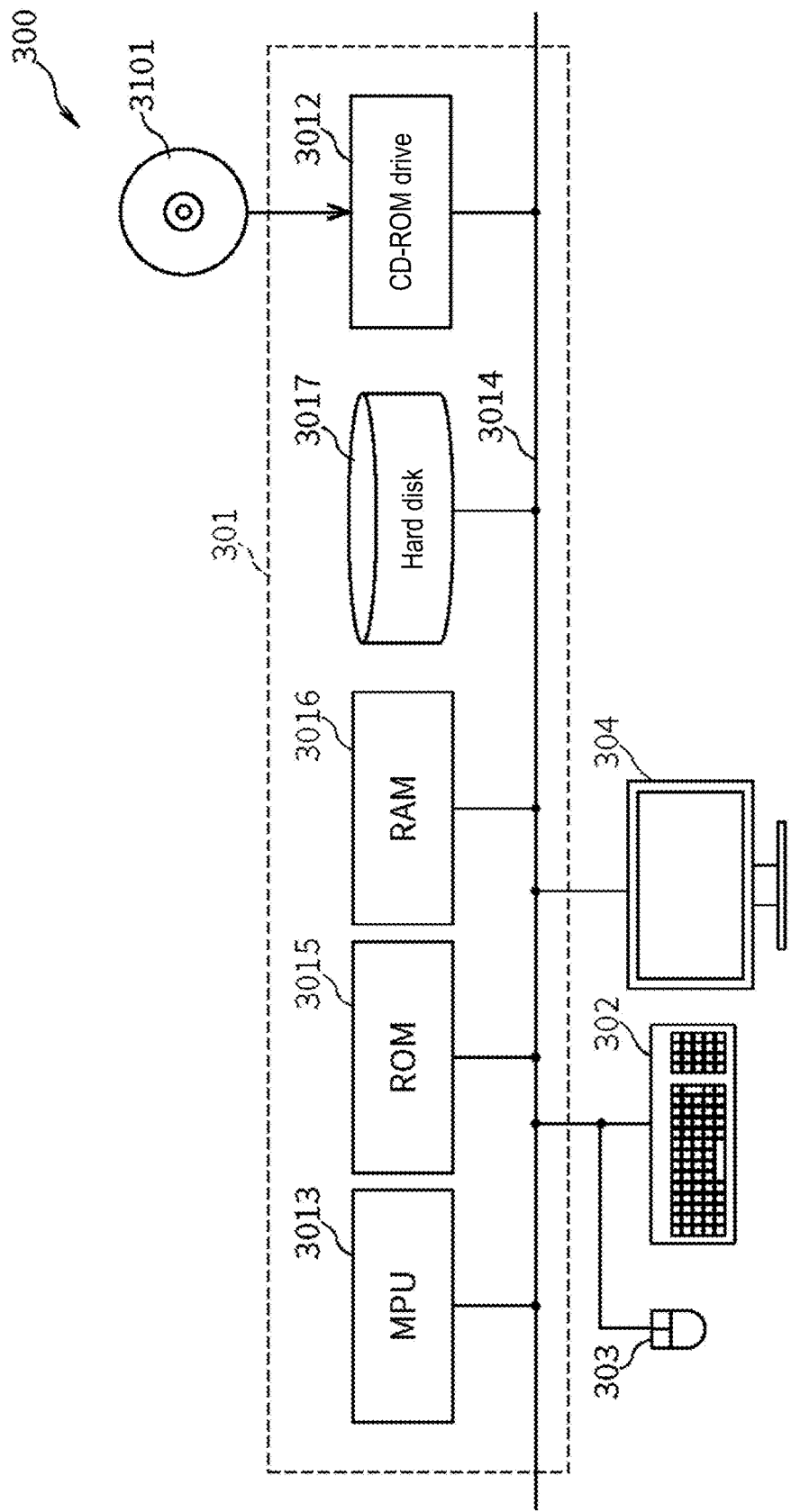
FIG. 20 is a block diagram of the computer system.

In FIG. 20, the computer 301 includes, in addition to the CD-ROM drive 3012, an MPU 3013, a bus 3014 connected to the CD-ROM drive 3012, etc., a ROM 3015 storing programs such as a bootstrap program, a RAM 3016 connected to the MPU 3013 for temporarily storing application program instructions and providing temporary storage space, and a hard disk 3017 for storing application programs, system programs, and data. Although not shown here, the computer 301 may further include a network card that provides connection to a LAN.

The program for executing the functions of the information processing device 1, etc. of the embodiments described above in the computer system 300 may be stored on the CD-ROM 3101, inserted into the CD-ROM drive 3012, and then transferred to the hard disk 3017. Alternatively, the program may be transmitted to the computer 301 via a network (not shown) and stored on the hard disk 3017. The program is loaded into the RAM 3016 when executed. The program may also be loaded directly from the CD-ROM 3101 or the network.

In addition, the computer executing the above program may be a single computer or multiple computers. That is, centralized processing may be performed, or distributed processing may be performed.

It goes without saying that in the above embodiments, multiple communication means existing in one device may be physically implemented with a single medium.

Furthermore, in the above embodiments, each processing may be implemented by centralized processing with a single device, or may be implemented by distributed processing with multiple devices.

The disclosure is not limited to the above embodiments, and various modifications are possible and it goes without saying that these are also included in the scope of the disclosure.

The invention claimed is:

1. An information processing device, comprising:
a storage part storing a target terminal identifier that identifies a target terminal and a user terminal identifier that identifies a user terminal in association with each other;
a reception part sequentially receiving target terminal position information that indicates a plurality of positions at different times of the target terminal which is moving, together with the target terminal identifier;
an acquisition part acquiring, from a mobile terminal that captures images of a region corresponding to each piece of the target terminal position information received by the reception part, a plurality of region images which are images obtained by shooting within the region, wherein each of the region images is an image in which an attribute value set and a right holder identifier are associated with each other, wherein the attribute value set comprises two or more pieces of environmental information that comprises position information specifying a shooting position and time information specifying a shooting time, and the right holder identifier identifies a right holder of the region image;
a construction part, based on each piece of the target terminal position information, temporally combining the plurality of region images acquired, or spatially fusing parts of the plurality of region images, to construct a single provision image;
a transmission part transmitting the provision image to the user terminal indicated by the user terminal identifier stored in association with the target terminal identifier in the storage part; and
a right holder processing part performing second preservation processing to accumulate the right holder identifiers respectively associated with the plurality of region images constituting the provision image in association with the provision image,
wherein the right holder processing part further performs third preservation processing to accumulate the right holder identifier identifying the user terminal which is a provision destination to which the provision image is transmitted, in association with the provision image.

2. An information processing method, used in an information processing device that comprises a storage part, a reception part, an acquisition part, a construction part, a transmission part, and a right holder processing part, the information processing method comprising:
a step of storing, in the storage part, a target terminal identifier that identifies a target terminal and a user terminal identifier that identifies a user terminal in association with each other;
a step of sequentially receiving, by the reception part, target terminal position information that indicates a plurality of positions at different times of the target terminal which is moving, together with the target terminal identifier;
a step of acquiring, from a mobile terminal that captures images of a region corresponding to each piece of the target terminal position information received by the reception part, a plurality of region images which are images obtained by shooting within the region by the acquisition part, wherein each of the region images is an image in which an attribute value set and a right holder identifier are associated with each other, wherein the attribute value set comprises two or more pieces of environmental information that comprises position information specifying a shooting position and time information specifying a shooting time, and the right holder identifier identifies a right holder of the region image;
a step of temporally combining the plurality of region images acquired, or spatially fusing parts of the plurality of region images based on each piece of the target terminal position information, by the construction part, to construct a single provision image;
a step of transmitting, by the transmission part, the provision image to the user terminal indicated by the user terminal identifier stored in association with the target terminal identifier in the storage part;
a step of performing second preservation processing, by the right holder processing part, to accumulate the right holder identifiers respectively associated with the plurality of region images constituting the provision image in association with the provision image; and
a step of performing third preservation processing, by the right holder processing part, to accumulate the right holder identifier identifying the user terminal which is a provision destination to which the provision image is transmitted, in association with the provision image.

* * * * *